United States Patent [19]

Smith

[11] Patent Number: 5,317,620
[45] Date of Patent: May 31, 1994

[54] INFRARED ALARM SYSTEM

[75] Inventor: Milton O. Smith, Bothell, Wash.

[73] Assignee: Orca Technology, Inc., Seattle, Wash.

[21] Appl. No.: 862,834

[22] Filed: Apr. 2, 1992

[51] Int. Cl.⁵ .................. H04M 11/04; H04M 11/00; G08B 13/18
[52] U.S. Cl. ........................................ 379/40; 379/44; 379/50; 379/51; 379/37; 379/102; 340/567
[58] Field of Search ................. 379/39, 40, 44, 45, 379/46, 48, 49, 50, 51, 53, 54, 102, 104; 340/541, 565, 567, 556, 551, 552; 250/338.1, 338.3, 342, 353

[56] References Cited

U.S. PATENT DOCUMENTS

| | | | |
|---|---|---|---|
| 4,492,820 | 1/1985 | Konnard et al. | 379/51 |
| 4,849,737 | 7/1989 | Kirihata et al. | 340/567 |
| 4,912,748 | 3/1990 | Horii et al. | 340/567 |
| 4,922,450 | 5/1990 | Rose et al. | 379/105 |
| 5,101,194 | 3/1992 | Sheffer | 340/567 |
| 5,107,120 | 4/1992 | Tom | 340/567 |

FOREIGN PATENT DOCUMENTS 0204965 8/1988 Japan ..................................... 379/44

Primary Examiner—Curtis Kuntz
Assistant Examiner—Jasan Chan
Attorney, Agent, or Firm—Seed and Berry

[57] ABSTRACT

A battery-powered infrared sensor security system capable of operating on a single set of batteries for a minimum of one year. The system is connected to a telephone line and employs a bidirectional dual-tone multiple frequency (DTMF) tone generator/receiver to allow communication to and from a remote location. The system status may be checked from the remote location and certain system parameters may be varied from the remote location. The system uses a Fresnel lens arrangement and a pair of infrared sensors to provide a substantially uniform field of coverage of 180°. The system also uses real time digital analysis of the output signals from the infrared sensors. The digital analysis uses time sequence analysis of the output signals, performs variance measurements between the current measurement of the infrared sensor signals and the stored time sequence, coherence measurements between the two sensors, and can compare measured amplitude spectra to predefined signature spectra entered by the user.

81 Claims, 15 Drawing Sheets

INFRARED ALARM SYSTEM

DESCRIPTION

1. Technical Field

The invention relates generally to alarm systems, and in particular to a battery-powered infrared alarm system connected to a telephone line.

2. Background of the Invention

Alarm systems are used in a broad variety of applications ranging from building security to fire detection. Various types of detector mechanisms have been employed for use in security systems. For example, mechanical switches or magnetic switches are often used at windows and doors to detect an intruder. These switches may be of the normally open or normally closed type. If a detector switch is normally open, closure of the switch will activate the alarm. In contrast, a set of normally closed detector switches may be connected in series. Opening any one of these multiple switches will break the circuit continuity and trigger the alarm. Similarly, metal foil is often used on windows to provide electrical continuity in a detection circuit. If the window is broken the foil tears, thus triggering the alarm.

Technological advances have provided additional types of detectors. For example, infrared sensors are now available to sense temperature and motion. The drawback of these sensors is their susceptibility to false triggering from thermal sources such as an appliance or heater vent within the building. Other thermal sources, such as small animals, frequently cause false triggering of infrared sensors.

The typical infrared alarm system has a predetermined threshold. If any thermal source causes the infrared sensor to exceed the predetermined threshold, an alarm is activated. Thermal sources such as an appliance or a heater vent near a drapery may be incorrectly interpreted as an intruder. Prior art infrared alarm systems used in an outdoor environment are susceptible to false triggering from trees or shrubbery, pools of water or metal objects such as a shed. The prior art systems have no reliable means for identifying unique thermal signatures. Prior art systems are also subject to false triggering due to shock or vibration of the infrared sensors if the sensors are not mounted in a secure location.

Another potential drawback of prior art alarm systems is their inability to function during power outages. To overcome this problem, manufacturers have generally used battery backups to power the systems during power outages. The power requirements of a typical prior art infrared alarm system exceeds the current capacity of small batteries. As a result, the backup batteries are often large and cumbersome, and require periodic maintenance to assure their reliability.

Once an alarm has been triggered, alarm systems report the occurrence in a variety of manners ranging from a loud alarm signal at the site of the intrusion to dialing a predetermined telephone number and reporting the incident electronically. While the latter system is more expensive, it is generally more desirable since a local alarm can be silenced by cutting the wires between the alarm system and the alarm signal, or simply ignored, if it is heard at all.

Because alarm systems of the prior art require large backup batteries, and because infrared alarm systems of the prior art are susceptible to false triggering, it has previously been impossible to incorporate the desirable features of an infrared alarm system into a small, reliable package.

Therefore, it can be appreciated that there is a significant need for an alarm system that uses infrared sensors which are not susceptible to false triggering and can be operated by a battery with infrequent maintenance.

SUMMARY OF THE INVENTION

The inventive system, which is powered by a battery, contains at least two infrared sensors and a lens system positioned in front of the sensors to provide multiple detection ranges with substantially uniform response over a field of view of 180°. An analog preamplifier connected to the infrared sensors amplifies the signals from the sensors, and an analog filter filters the signals from the amplifier. An analog-to-digital converter converts the filtered signals and provides the digitized signals to a digital signal processor where a time series of digitally filtered signals is created. In one embodiment of the invention, the digital signal processor creates a running mean of the digitally filtered signals and determines a variance between the current measurement and the running mean. A coherence value between the two sensors is also calculated. The system has the capability of storing several signature patterns associated with normal activity, and determining a similarity value between the stored signatures and the current measurement. A digital trigger is generated if the variance, coherence and similarity values are not within predetermined levels. If the digital processor generates the digital trigger, an alarm is activated.

In addition to the digital signal processor, the present invention contains dual-tone multiple frequency (DTMF) communication circuitry. A DTMF generator communicates an alarm condition and other system status information to a predetermined remote location over a telephone line to which the inventive system is connected. The system also has a DTMF receiver circuit. The system can be remotely programmed via the telephone line if a predetermined DTMF access code sequence is received from the remote location over the telephone line.

The system reduces power consumption by emulating many DTMF functions in software. In addition, the inventive system has power management circuitry which keeps much of the circuitry in a standby mode, thus reducing power requirements and allowing the system to be operated by a small current capacity battery for up to one year.

DETAILED DESCRIPTION OF THE INVENTION

Figure 1A:
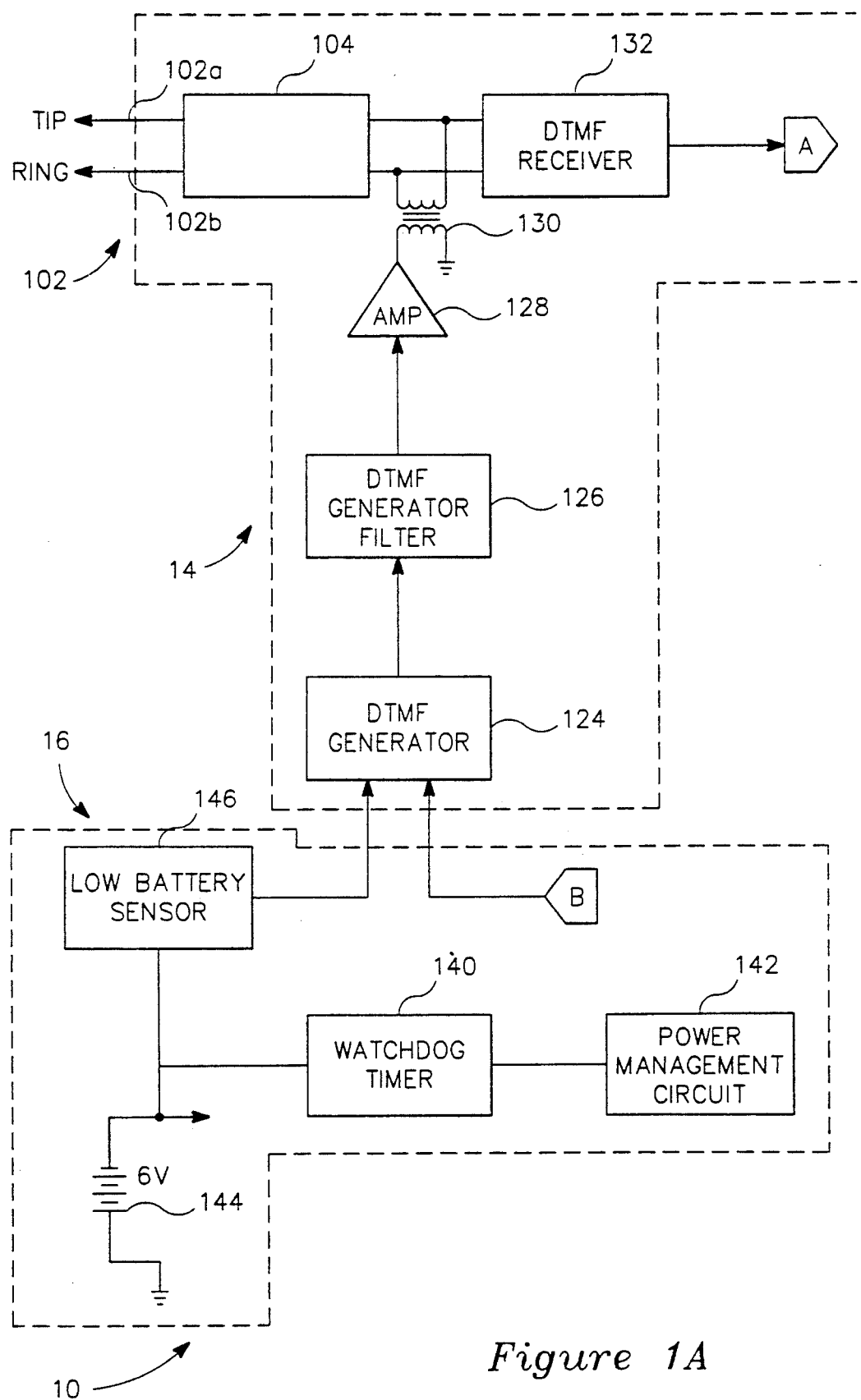
FIG. 1A is a functional block diagram of the security system of the present invention.
Figure 1B:
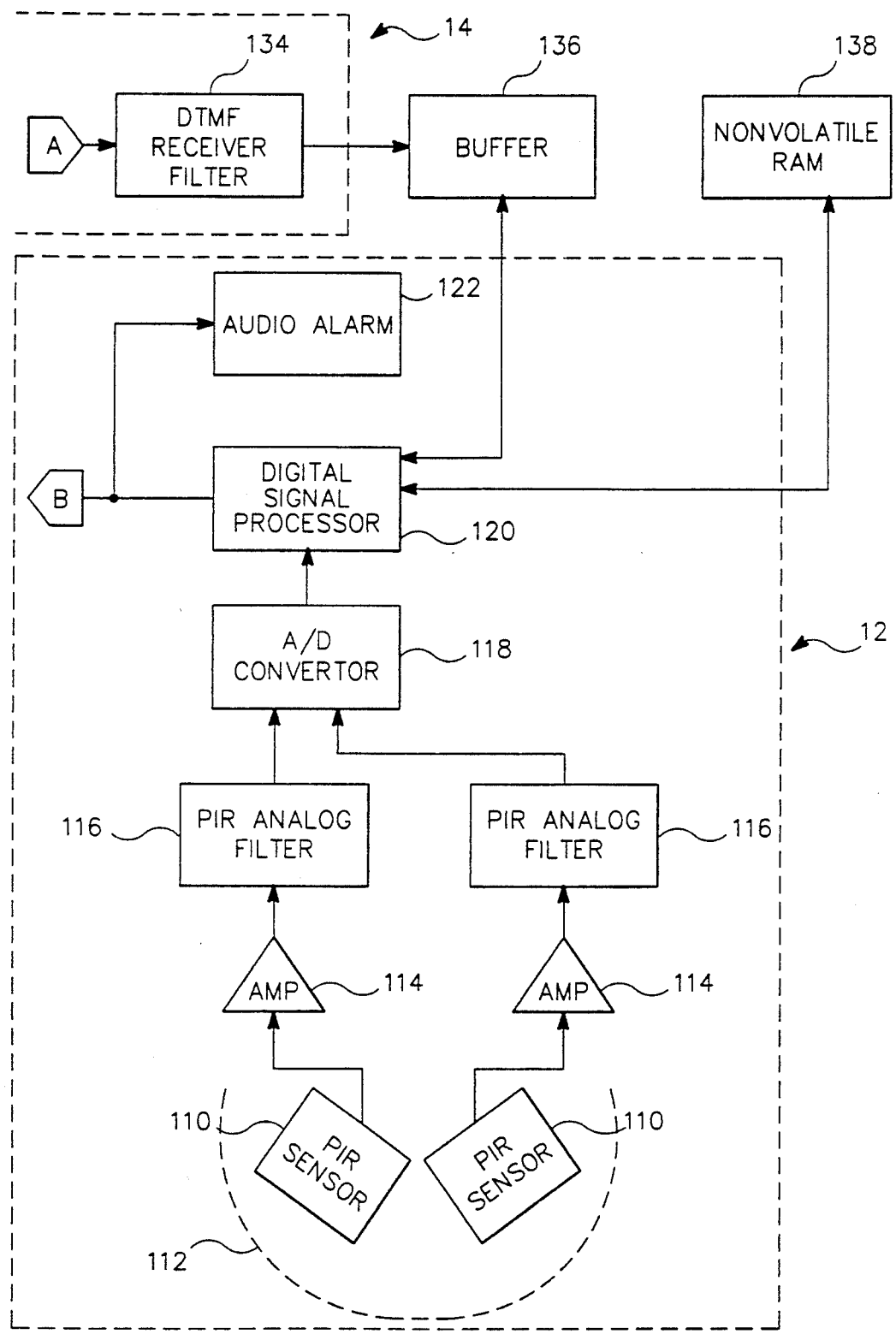
FIG. 1B is a continuation of the functional block diagram of FIG. 1A.

As shown in a functional block diagram of FIGS. 1A and 1B, the present invention is embodied in a security system 10 including detection circuitry 12, dual-tone multiple frequency (DTMF) communication circuitry 14, and power management circuitry 16. The system 10 is connected to a telephone line 102 via a standard telephone connector 104. The standard telephone line 102 consists of a TIP line 102a and a RING line 102b.

The detection circuitry 12 includes a pair of pyroelectric infrared (PIR) sensors 110, shown in FIG. 1B, and a Fresnel lens system 112 is placed in front of the infrared sensors 110. The Fresnel lens system 112, which provides multiple detection ranges, will be described in greater detail below. The infrared sensors 110 generate an electrical signal in response to thermal sources. The electrical output signal from each of the infrared sensors 110 is amplified by a separate analog preamplifier 114. Alternatively, the detection circuitry 12 may use a single analog preamplifier connected to multiple infrared sensors 110 through an analog multiplexor (not shown).

An analog filter 116 is used with each of the analog preamplifiers 114 to provide bandpass filtering for the output signal from the analog preamplifier. The filtered analog signal is passed to an analog to digital convertor (ADC) 118, which converts the analog voltage to a digital signal. A microprocessor U4 (see FIG. 8D), functioning as a real-time digital signal processor 120, receives the digitized signal from the ADC 118 and performs additional real-time digital signal processing. The digital signal processing will be described in greater detail below. If the digital signal processor 120 determines an alarm condition exists, a digital trigger is generated and a local audible alarm 122 is activated.

The DTMF communication circuitry 14 generates standard dualtone multiple frequency (DTMF) signals to communicate alarm conditions and other status information via the telephone line 102 to a predetermined remote location. The digital DTMF signals are generated by a DTMF tone generator 124 and filtered by an analog DTMF generator filter 126, as shown in FIG. 1A, so that the output signals conform with the standards required by the telephone company. The filtered analog signal is amplified by a low-powered operational analog amplifier 128 and coupled to the telephone line 102 through an audio transformer 130.

The DTMF communication circuitry 14 also includes a DTMF receiver 132, which is also connected to the telephone line 102 via the telephone connector 104, and provides its analog output signals to a DTMF receiver filter 134 (see FIG. 1B). The DTMF receiver filter analyzes the output signals to determine if the output signals are valid DTMF tones. Telephone push buttons have an industry standard frequency for each row and column. By identifying the two frequencies (one frequency for a row and one frequency for a column), it is possible to identify which button is depressed. For purposes of this application, a valid DTMF tone must have the correct standard frequencies and be present on the telephone line 102 for a predetermined period of time. If a predetermined DTMF access code sequence is received via the telephone line 102, the valid DTMF tones detected by the DTMF receiver filter 134 are stored within a buffer. Parameters such as the digital filtering times, digital signal processor values, and the telephone number of the remote location are stored within a nonvolatile random access memory 138. These parameters may be altered remotely via the telephone line 102 by transmitting the predetermined DTMF access code sequence and additional DTMF code sequences corresponding to commands that alter the data in the nonvolatile memory 138. This security precaution prevents unauthorized access to the security system 10.

The system 10 is powered by a small battery 144. A low battery sensor circuit 146 provides an indication of the battery condition. Power consumption of the security system 10 is reduced by the power management circuitry 16 which includes a watchdog timer 140 and a power management circuit 142. The watchdog timer 140 is continuously powered by the battery 144, and generates a periodic pulse train at a predetermined rate. The power management circuit 142 responds to the periodic pulse train generated by the watchdog timer 140 to activate the remainder of the circuitry. When the circuitry is inactivated by the power management circuit 142, the circuitry is in a standby mode, and thus has reduced power consumption.

The security system 10 of the present invention implements an infrared sensor arrangement and real-time digital signal processing that reduces the susceptibility to false alarms. The system both generates and receives DTMF tones, which allows two-way communication over the standard telephone line 102. In addition, the power management circuitry 16 allows the entire system to be powered by the low power battery 144 for a minimum of one year without the need for any battery maintenance.

DETECTION CIRCUITRY

Figure 2A:
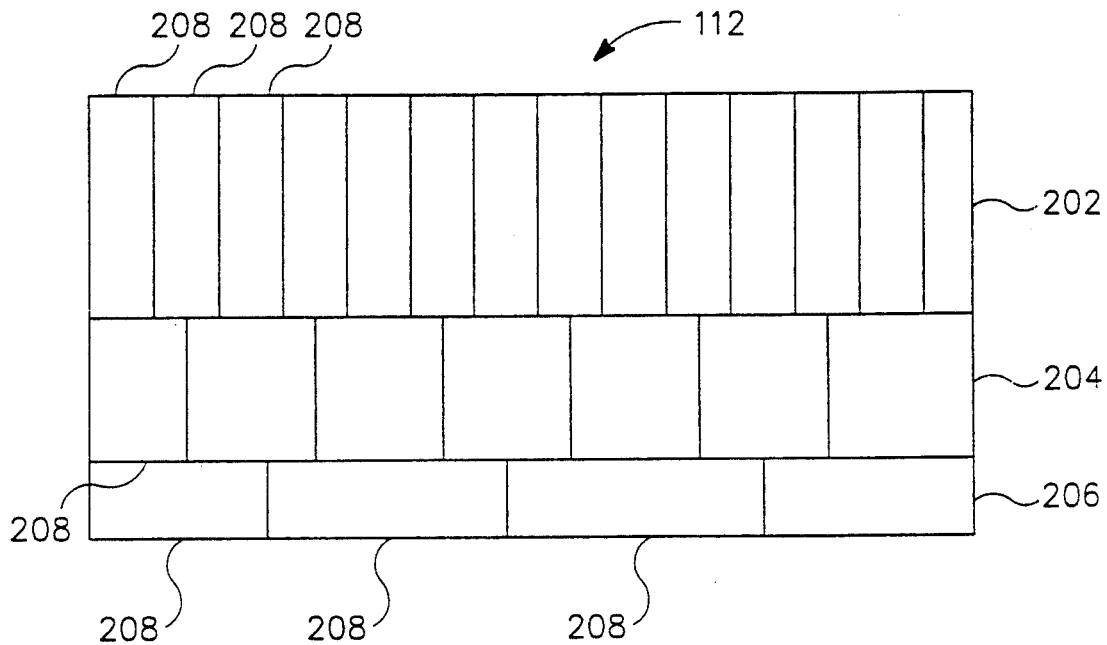
FIG. 2A illustrates the physical arrangement of a Fresnel lens system of the present invention.
Figure 2B:
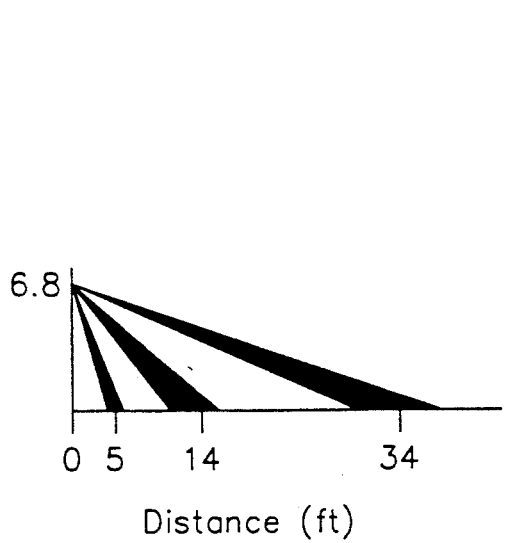
FIG. 2B illustrates a side view of the zones of coverage created by the lens system of FIG. 2A.

The Fresnel lens system 112 combined with the infrared sensors 110 provides substantially uniform response over 180° field of view as well as three separate detection ranges. The arrangement of the Fresnel lens system 112 is shown in FIG. 2A. Lens technology in general, and Fresnel lens technology in particular, is well known to those of ordinary skill in the art and will not be discussed in great detail here. The Fresnel lens system 112 is comprised of first, second, and third sets of lenses 202, 204, and 206, respectively, with the second set positioned above the third set, and the first set positioned above the second set. The lens sets divide an area of coverage into three ranges, as shown in FIG. 2B. The first set of lenses 202 provides a field of coverage at a nominal range of approximately 34 feet from the infrared sensors 110. The second set of lenses 204 provides a field of coverage at a nominal range of approximately 14 feet from the infrared sensors. The third set of lenses 206 provides a field of coverage at a nominal range of approximately 5 feet from the infrared sensors. This multiple lens arrangement provides greater detection range than a single lens system, and does not require the use of an infrared sensor for each detection range.

Figure 2C:
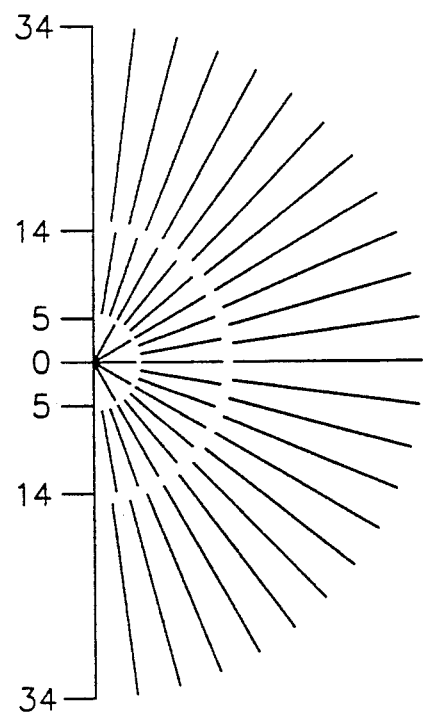
FIG. 2C illustrates a top view of the zones of coverage created by the lens system of FIG. 2A.

Each of the first, second, and third sets of Fresnel lenses 202, 204 and 206 is comprised of a series of horizontally arranged lens segments 208. Each series of the lens segments 208 comprising one of the three sets of lenses 202, 204, and 206 divide the field of coverage for the lens set into zones extending radially from the sensor 110, as shown in FIG. 2C, with the zones for each lens set being at a different range from the infrared sensors 110. The Fresnel lens system 112 uses a different width of lens segment 208 for each of the three sets of lenses 202, 204 and 206. The various segment widths are designed to provide radial zones of approximately one meter in width at the nominal range from the infrared sensors 110 specified above for the set of lenses.

Figure 3A:
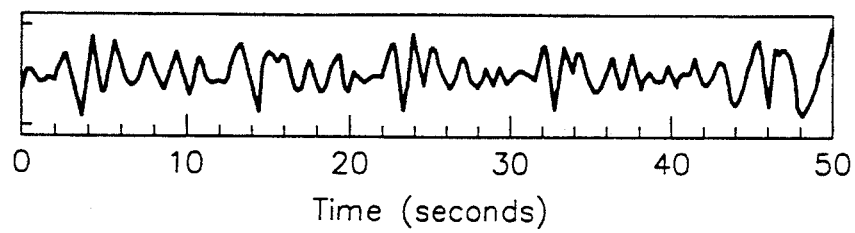
FIG. 3A illustrates the analog output of an infrared sensor of the present invention when a person moves laterally to the sensor.

As a result of the vertical and horizontal segmented arrangement of the Fresnel lens system 112, the overall field of coverage for the infrared sensors 110 is divided into an array of coverage zones. The use of coverage zones aids in the identification of sources of infrared energy. As a thermal source, such as a person moves from one zone to another, the lens segments cause small signal fluctuations to appear at the output of the infrared sensors 110, as shown in FIG. 3A. The number of fluctuations in the sensor output and the amplitude of the fluctuations are used to identify different thermal sources, such as appliances, small pets, people, and radio frequency interference (RFI). For example, a thermal source such as an appliance will generate thermal energy that will stay basically within one or more zones, generating no signal fluctuations. In contrast, a small pet moving laterally across a room within the field of coverage of the infrared sensors 110 will generate a series of fluctuations as the pet moves laterally from one zone to another within the zones of one of the sets of lenses 202, 204, or 206. Similarly, a person moving laterally across the room will generate a different series of fluctuations as the person moves from one zone to another. Furthermore, the person is more likely to cross zones within at least two of the sets of lenses because of the larger height of a person compared to a small animal, thus generating more fluctuations for the infrared sensors 110 to detect.

The Fresnel lens system 112 divides an area of coverage into an array of coverage zones and allows the generation of signal fluctuations that can be correlated with different thermal sources. The correlation process is performed by real-time digital signal analysis, which will be discussed in greater detail below.

Figure 4:
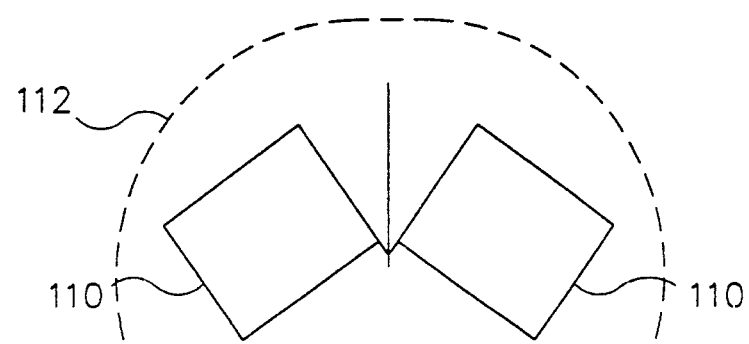
FIG. 4 illustrates the physical arrangement of the lens system and the infrared sensor of the present invention.

In the presently preferred embodiment, the two infrared sensors 110 are mounted at opposing 45° angles as shown in FIG. 4. By combining the dual sensors and the Fresnel lens system 112 manufactured specifically for this arrangement of sensors, it is possible to provide substantially uniform response over a field of view of 180°. The infrared sensors 110 generate a small electric analog voltage as an output signal in response to changes in detected infrared radiation. The infrared sensors also respond to electromagnetic interference (EMI), radio frequency interference (RFI), changes in room temperature, as well as thermal radiation of approximately 8 $\mu$m to 14 $\mu$m wavelength. Because of this sensitivity to the various sources of interference, it is difficult to discriminate between thermal radiation emitted by human motion and by other sources and the background, all of which affect the sensor output signal.

Figure 3B:
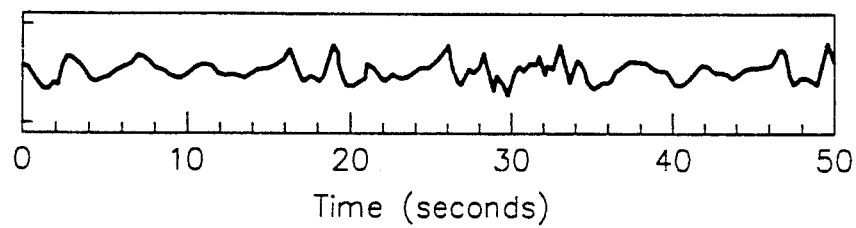
FIG. 3B illustrates the analog output of the infrared sensor of the present invention when a person moves in a direction perpendicular to the sensor.

FIGS. 3A-3F illustrate typical examples of output signals from the infrared sensors 110 combined with the Fresnel lens system 112 of the present invention. In FIG. 3A, the thermal source is a person at a distance of seventeen feet from the infrared sensors 110 and moving laterally relative to the sensors by a distance of ten feet. As the person moves from one zone to another, a series of signal fluctuations is generated by the infrared sensors 110. In FIG. 3B, the thermal source is a person moving in a direction away from the infrared sensors 110 while attempting not to move laterally so as to cross between radial zones.

Figure 3C:
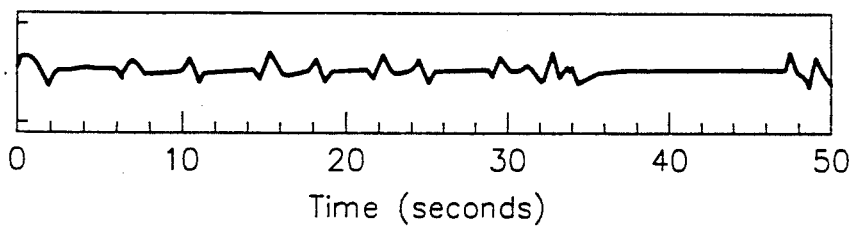
FIG. 3C illustrates the analog output of the infrared sensor of the present invention when a person moves laterally to the sensor in another room at some distance from the sensor with a doorway leading to the room.

FIGS. 3C-3F illustrate output signals from the infrared sensors 110 that are frequently interpreted as alarm conditions by prior art systems. In FIG. 3C, the infrared sensors 110 are monitoring one room. The thermal source is a person in another room moving laterally relative to the infrared sensors 110, with an open doorway connecting the two rooms. As the person moves past the open doorway some signal fluctuations are generated. In response, prior art systems would generate an alarm condition if the sensor output signal voltage exceeds a predetermined threshold. In contrast, the present invention will analyze the fluctuations generated by the infrared sensors and the amplitude of the output signal to determine that no alarm condition exist.

Figure 3D:
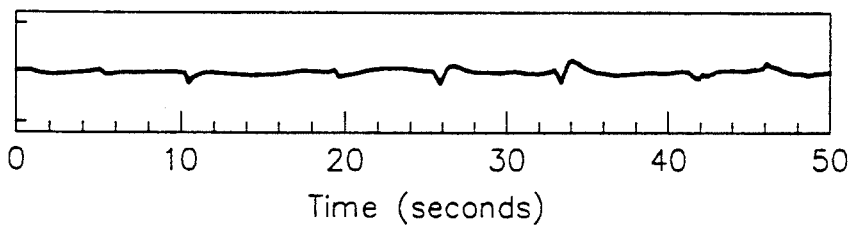
FIG. 3D illustrates the analog output of the infrared sensor of the present invention when a weight is dropped on the sensor and when the sensor itself is dropped.

In FIG. 3D, the output signal of the infrared sensors 110 changes in response to dropping the system from a height of one inch and to dropping a two-pound weight onto the system from a height of one inch. This sensitivity to vibrations and jarring may cause false alarms in prior art alarm systems. However, if the security system 10 is mounted in an area where it is subject to vibrations, the digital analysis by the present invention prevents such false alarms.

Figure 3E:
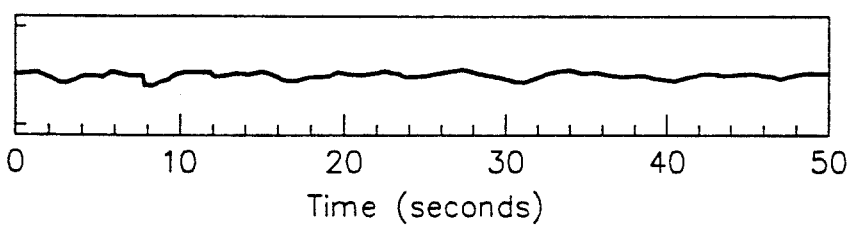
FIG. 3E illustrates the analog output of the infrared sensor of the present invention when a mechanical thermal source is directed towards the sensor.

In FIG. 3E, the thermal source is a 1000 Watt hair dryer aimed at the infrared sensors 110 from a distance of seven feet. Note that the thermal source does not generate the signal fluctuations that a human generates in FIGS. 3A and 3B.

Figure 3F:
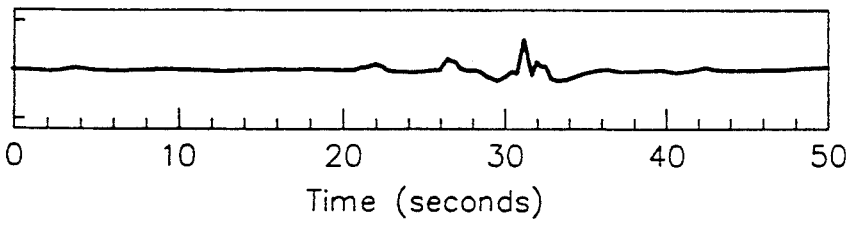
FIG. 3F illustrates the analog output of the infrared sensor of the present invention when a cat moves diagonally across the zones of coverage.

In FIG. 3F, the thermal source is a cat moving, both laterally and in a direction away from the infrared sensors 110 at distances ranging from eight to eighteen feet. Prior art systems often improperly interpret this activity as an alarm condition since it generates signal fluctuations that exceed the alarm threshold. In contrast, the present invention analyzes the amplitude spectrum and analyzes the frequency content of the analog signal to prevent false triggering. The digital analysis used is discussed in greater detail below.

Figure 8A:
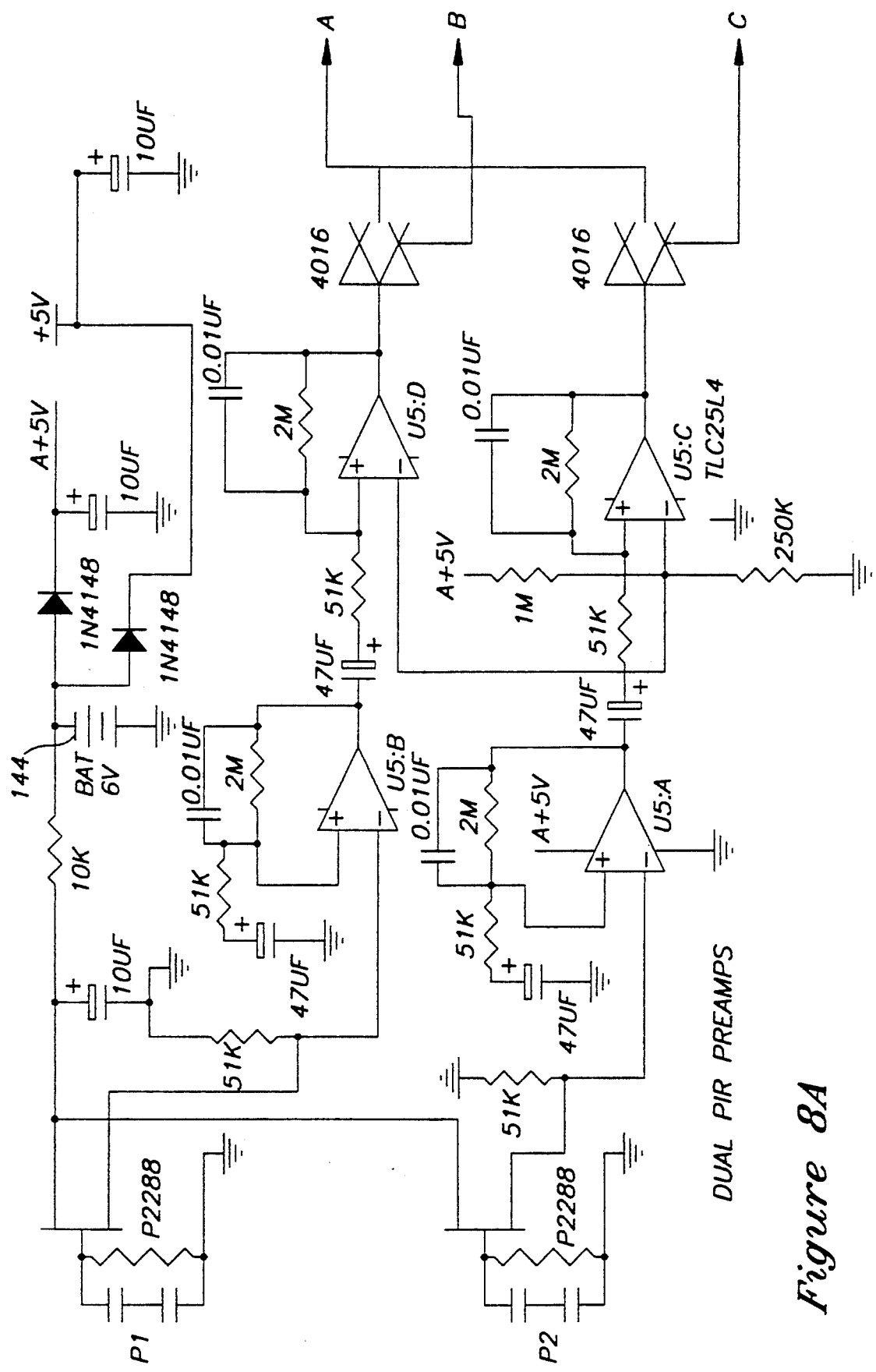
FIGS. 8A, 8B, 8C and 8D are detailed schematics of the present invention.

The output signals from the infrared sensors 110 must be amplified and filtered before they are digitized. The analog preamplifier 114 and the analog filter 116 of the detection circuitry 12 are designed using standard low power operational amplifiers. In the presently preferred embodiment, a low power operational amplifier U5 (see FIG. 8A) is connected to each of the infrared sensors 110 and serves both as a preamplifier 114 and an analog filter 116 for the sensor. The filter circuits are used to bandpass filter the output signal received from one of the infrared sensors 110 to which it is connected. The analog filter 116 is designed to pass frequencies from 0.1 Hz to 5 Hz. There are numerous circuits well known to those of ordinary skill in the art which may be used to accomplish this task. The operational amplifier is chosen for its low power consumption. In the presently preferred embodiment, a TLC25L4 quad operational amplifier U5 is used; however, any suitable low power operational amplifier may be used.

Figure 8B:
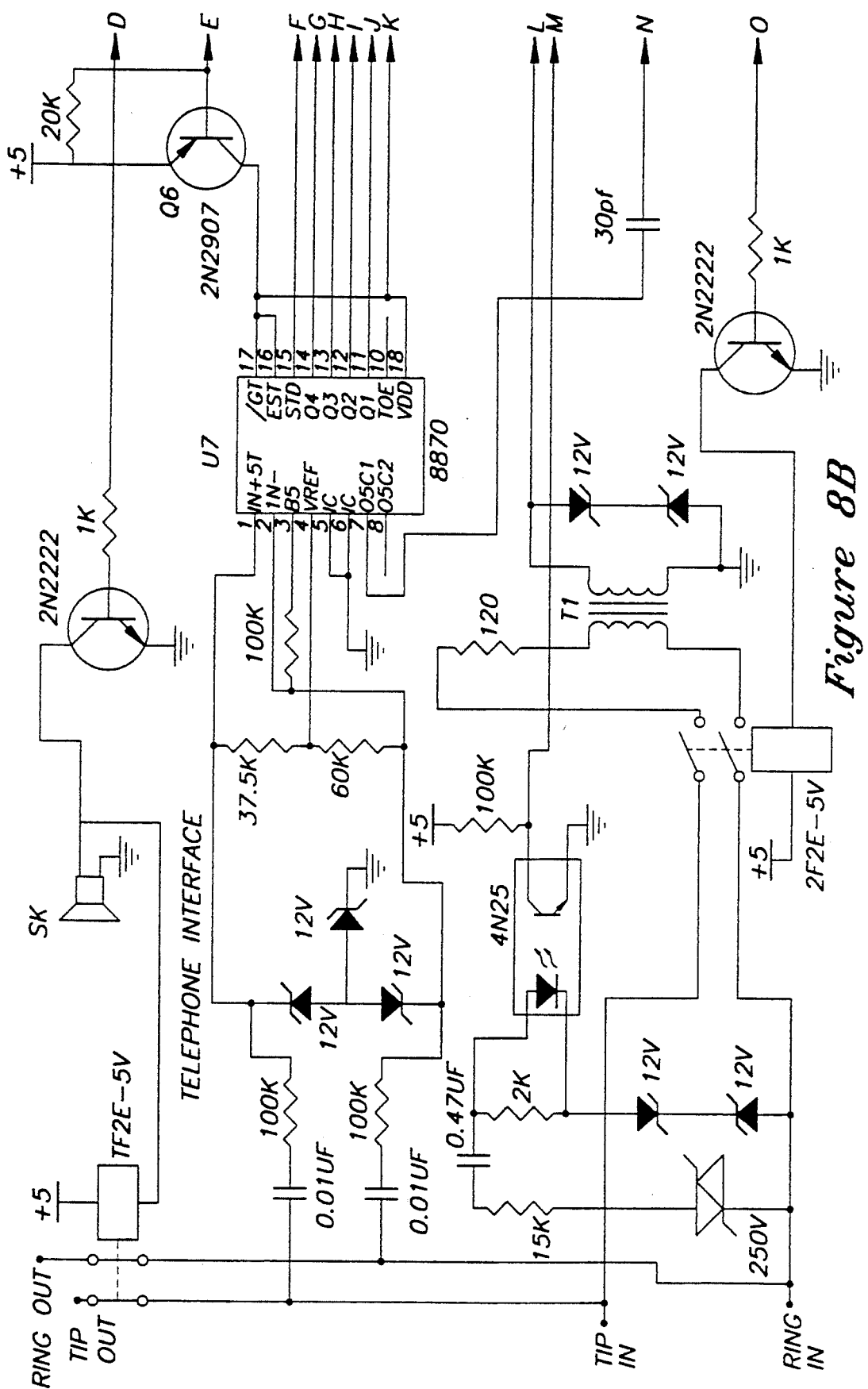
Figure 8C:
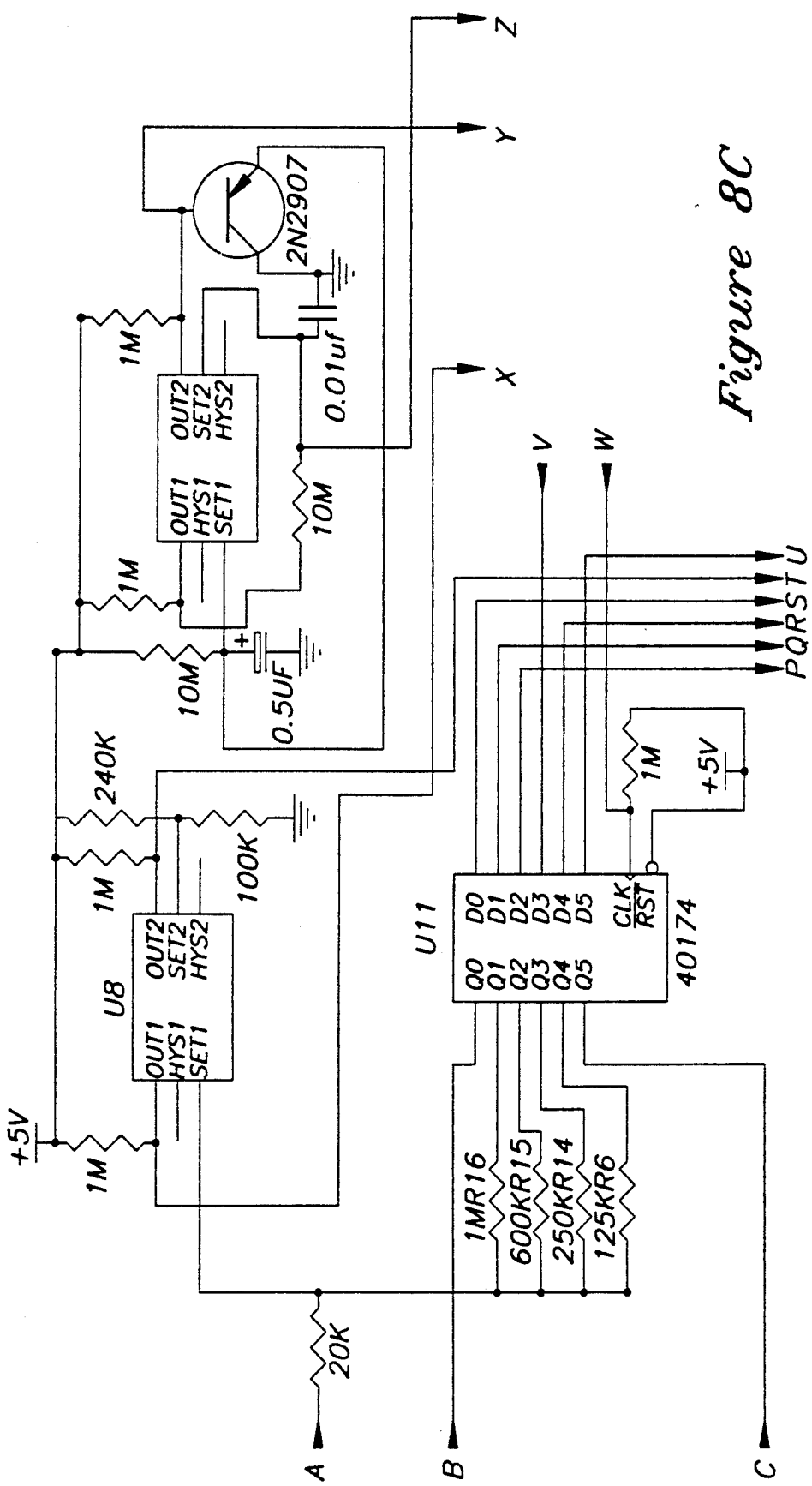

The output signal of the analog filter 116 is then converted to a digital signal by the ADC 118. In the presently preferred embodiment, the ADC 118 is comprised of a comparator U8 (see FIG. 8C) and a digital to analog converter (DAC). The DAC utilizes a low power digital register U11 and four discrete summing resistors, R6, R14, R15, and R16, thus giving the ADC sixteen levels of resolution. This type of analog to digital conversion is well known to those of ordinary skill in the art, and will not be discussed in detail. The discrete current summing resistors were chosen to minimize current consumption, thus increasing battery life. The present invention uses approximately 10 microamps of current. The ADC 118 samples each of the infrared sensors 110 for 0.5 milliseconds, during which time eight discrete measurements are taken. The eight measurements are averaged to provide a single digital value. A new set of measurements is made every 500 milliseconds.

Prior art infrared sensor systems typically use an analog threshold level and pulse counting technique to determine an alarm condition. Each time the analog signal from the sensor exceeds a predetermined threshold, an internal counter is incremented. If a minimum number of counts occur within a specified time period, an alarm condition has occurred. As previously discussed, this type of alarm system is susceptible to false triggering from thermal sources such as machinery and small animals like cats and dogs. Increasing the analog threshold reduces the number of false triggers but does not completely eliminate them. If the threshold is increased too much in an attempt to limit false triggers, the presence of a human intruder may go undetected. The degree of confidence with which a thermal source may be identified is proportional to the number of measurements used in the analysis and the length of time over which measurements are analyzed. For example, the least certain decision would be one based on a single output of a single event from a single infrared sensor. For this reason, most infrared sensor systems use the pulse counting technique described above to increase the validity of the measurement, so that no decision is based on a single event.

In contrast, the security system 10 of the present invention performs real-time digital signal analysis on the output of the infrared sensors 110 using a frequency distribution of intensities to differentiate between thermal sources affecting the infrared sensors. The creation of a frequency distribution is discussed in detail below. The filtering techniques, coupled with the design of the Fresnel lens system 12, are designed to spread out the energy received by the infrared sensors over a variety of sources so that a unique signature is obtained from different thermal sources. The system of the present invention uses digital filtering to eliminate spurious sources of thermal radiation. Thermal sources can be identified based on the periodicities of the thermal radiation intensity and the coherence between a time series of measurements from the infrared sensors 110. The presently preferred embodiment of the security system 10 can store a time series of up to 10 seconds with a 500 millisecond resolution. This time series of measurements creates an amplitude spectrum which aids in the identification of thermal sources being measured by the infrared sensors. For example, buoyant thermal energy generated from heat vents have relatively constant periodicities at low frequencies which occur for a long period of time (e.g., at least 30 seconds). Either of the infrared sensors 110 will thus produce an amplitude spectrum with a dominant energy occurring at lower frequencies, with almost no power at the higher frequencies. The security system 10 analyzes the number of fluctuations of the output signals of the infrared sensors 110 over time to determine that the buoyant thermal energy is not an alarm condition. In contrast, human motion will typically occupy two zones of different ranges when at distances closer than 15 feet, resulting in multiple fluctuations of the output signal from the infrared sensors 110. The number of fluctuations for human motion will depend on the frequency of crossing zone boundaries in the Fresnel lens system 112. Small animals such as pet cats or dogs are characterized by smaller surface areas than humans, and generate fewer fluctuations than humans. Small animals will typically only occupy a single zone. The security system 10 of the present invention utilizes different methods of analysis to identify a thermal source.

Figure 8D:
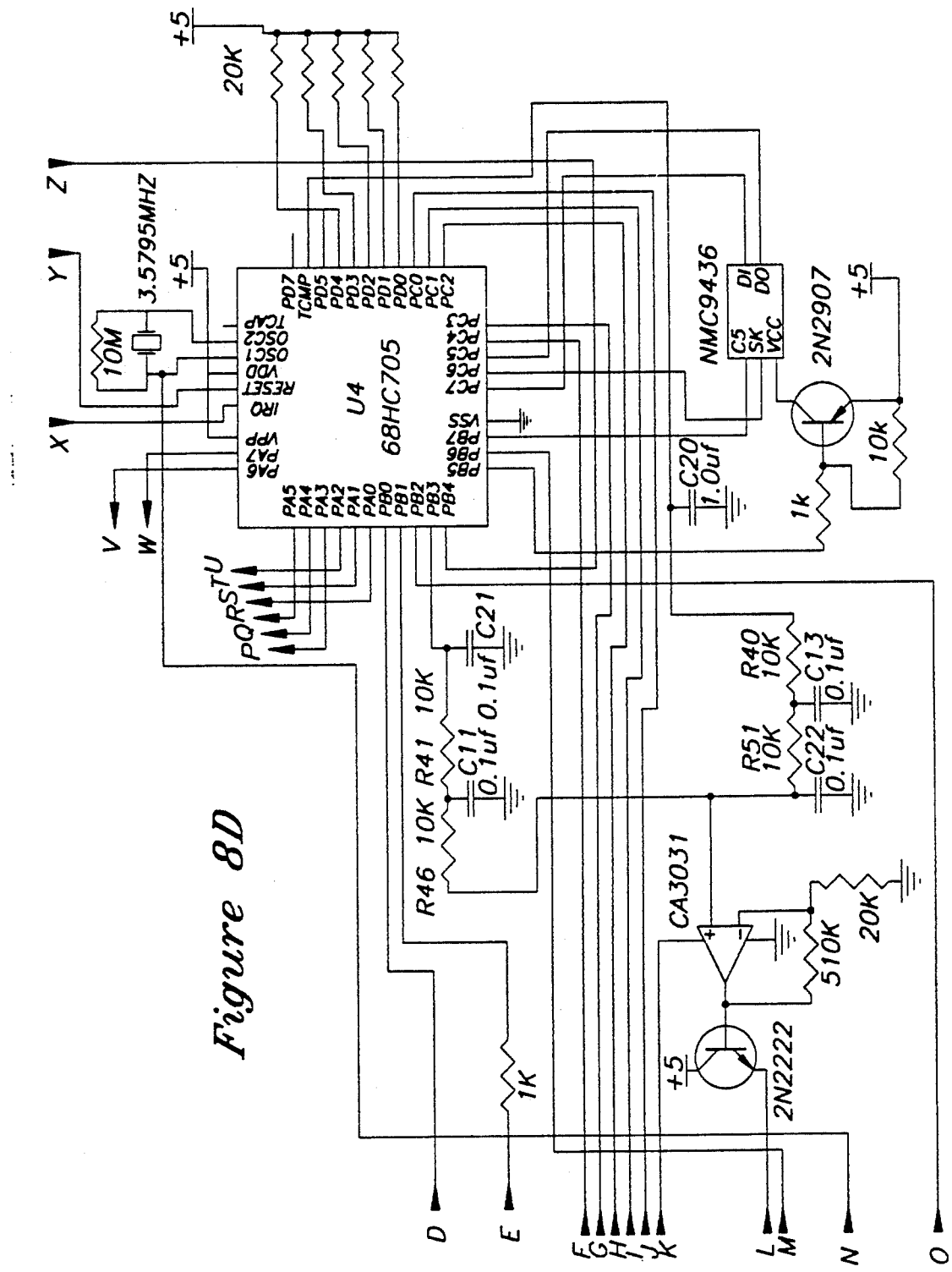

The real-time digital signal processor 120 (see FIG. 1B) is programmed within a microprocessor U4 (see FIG. 8D). One step of the digital signal analysis is to digitally filter the signal provided by the ADC 118 to produce high pass and low pass outputs. The digital high pass filter uses the generic algorithm $$[d_i - d_{i-k} \geq V \text{ and } 2 \times V]$$

where each data point is $d_i$ measured with a time lag k. If the difference between the data points $d_i$ and $d_{i-k}$ exceeds predetermined threshold, $2 \times V$, then the signal is checked for symmetry. The following equation detects for near equal departures of the infrared sensor in both directions from a steady-state output level:

$$[d_i - M \geq V \text{ and } d_{i-k} - M \leq V]$$

or $$[d_i - M \leq V \text{ and } d_{i-k} - M \geq V]$$

where M is the value of a running mean calculated according to the formula described below. The time lag k between measurements is a variable read in from the nonvolatile memory 138 (see FIG. 1B) and can be altered by remote programming of the security system 10. While the above described formula is being used as a high pass digital signal processor, the system has a reduced response to low period events characterized by a thermal source moving laterally at a constant distance from the infrared sensors 110. To enhance the alarm response to low frequency events, a running mean for each infrared sensor channel is calculated from the following formula:

$$M = \frac{\sum_{i=1}^{N} d_i}{N}$$

where $d_i$ is the digitized value from one infrared sensor 110. The length of the series N is variable from 1 to 10 which covers a period of 0.5 to 5.0 seconds. The length of the series, N, is programmed into the nonvolatile memory 138 and can be altered from a remote location. Thus, the digital filtering techniques of the present invention surpass prior art techniques and give greater reliability and identification of unique thermal sources because the signals from the two infrared sensors 110 are analyzed over a period of time.

Other methods of real-time digital signal analysis are also used to identify the thermal source. To aid in the digital analysis, the presently preferred embodiment creates three bands of frequencies. The highest frequency is measured between every signal peak of the amplitude spectrum generated by the infrared sensors 110. A middle frequency is measured between every fourth signal peak generated by the infrared sensors. A low frequency is measured between every seventh signal peak generated by the infrared sensors. The three frequency bands may be remotely altered. The present invention calculates a variance in the amplitude spectrum of each infrared sensor channel for each frequency band.

The variance for each frequency band is determined using the generalized formula:

$$V = \frac{\sum_{m=1}^{K} (M_m - M_n)^2}{K}$$

where $M_m$ and $M_n$ are both means, but have different lengths such that $M_n$ is always a series of length greater than $M_m$. The measurement series length m and n are programmed into the nonvolatile memory 138 and can be altered by remote programming. The value of m and n are different for each of the three frequency bands. In the present preferred embodiment, the low frequency variance may be determined by letting m be of length 5 and letting n be of length 10. K is the number of mean lengths m that can be made within the mean length n (i.e., K=n/m). In the example above, K=2. To determine the variance for the middle frequency band, m is selected to be 3, n=9 and K=3. For the high frequency band, the variance is determined with m=1, n=2 and K=2. The security system 10 continuously determines a variance for each infrared sensor channel and for each of the three frequency bands. If any of the variance levels exceed a predetermined minimum level of variance, the security system 10 will process data further to determine if an alarm condition exists. The predetermined minimum levels of variance for each frequency band, which are stored in nonvolatile memory 138, may also be remotely altered.

As previously stated, the infrared sensors 110 respond to RFI and EMI as well as to thermal sources such as a human intruder. RFI and EMI generate periodicities covering a wide range of frequencies. However, these signals are highly correlated between the infrared sensors 110 (e.g., high coherence between sensors over the full range of measured frequencies). In contrast, human motion is typically chaotic, such that the amplitude spectrum has variable high and low frequency components with low correlation between the two infrared sensors 110. To identify radiation signals such as RFI or EMI, the security system 10 measures the coherence between the two infrared sensors 110. The coherence is the normalized covariance of the two infrared sensor channel measurements and is defined by:

$$C = \frac{\sum_{m=1}^{K} (X_m - X_n)(Y_m - Y_n)}{\Sigma (X_m - X_n)^2 \Sigma (Y_m - Y_n)^2}$$

where m, n and K are determined for each of the three frequency bands in the same manner as for the variance measurements described above. In addition, the coherence calculation involves measurements from both infrared sensor channels, denoted above as X and Y. The values for m, n and K for coherence measurements are also stored in the nonvolatile memory 138 and can be altered by remote programming. The alarm system 10 has a default coherence threshold value of 0.5; however, this value may be altered for a customized alarm system application, and may even be remotely altered. If the coherence between the infrared sensors 110 exceeds the predetermined coherence threshold, the security system 10 will reject the input as RFI/EMI induced or close range thermal effects. However, any overranging or under-ranging of the ADC 118 is reported as an alarm condition because such a condition could only be caused by covering up or disabling one of more of the infrared sensors.

If additional data processing is required, the security system 10 will compare the digital sample to user specified spectral signatures that can be regarded as originating from small thermal sources such as small animal pets or buoyant thermal energy from heat vents. A signature is precalculated at each of the three previously defined frequency bands by taking multiple measurements of activity associated with the small thermal source and calculating an average value for each of the three frequency bands and storing these "ideal" values in the nonvolatile memory 138. For example, a thermal source such as a heat vent may be measured over several cycles of heating and cooling to determine ideal values for the three frequency bands associated with this activity. In the presently preferred embodiment, up to four user-specified spectral signatures corresponding to small animal pets or buoyant thermal energy sources may be stored in the nonvolatile memory 138. A similarity value is computed at each of the three frequency bands for each of the user-specified signatures to determine if the thermal source detected by the infrared sensors 110 matches any of the stored user-specified signatures.

The similarity values are determined for each user-specified signature using the following formula:

$$S = \frac{\sum_{i=1}^{N} |A_i - B_i|}{N}$$

where A and B are the measured and ideal values, respectively. The variable N is the length of comparison and is stored in the nonvolatile memory 138. The length of comparison can be altered by remote programming. With the above formula, a high similarity has a similarity index of approximately zero. The similarity value is measured separately for each frequency band. The measured similarity value is compared to a predetermined similarity threshold value which is stored in the nonvolatile memory 138 and may be altered by remote programming. If the measured similarity values are less than the predetermined similarity threshold values for all three frequency bands for any one of the user-specified signatures, no alarm is sounded and the security system 10 discontinues further processing. A final signal processing step occurs if at least one of the measured similarity values exceeds the predetermined similarity threshold value for every stored signature. The present embodiment of the security system 10 also allows up to four user-specified spectral signatures to be regarded as originating from human movements. Like the signature patterns associated with small animal pets, a signature is determined for each of the three frequency bands using the procedure described above. The signatures and a predetermined similarity threshold value are stored in the nonvolatile memory 138 and may be remotely altered. If the measured similarity values are less than the predetermined similarity threshold values for all three frequency bands for any one of the user-specified signatures, no alarm is sounded and the security system 10 discontinues further processing. However, if at least one of the measured similarity values exceeds the predetermined similarity threshold value for every stored signature, an alarm is sounded.

When an alarm condition is detected, the digital signal processor 120 generates a digital trigger which activates the local available alarm 122 (in FIG. 1B). This alarm 122 may include a piezoelectric type speaker SK (see FIG. 8B) or any other low power audible alarm. In addition to the local alarm, the security system 10 also reports the alarm condition to a remote location via the telephone line 102.

DTMF COMMUNICATOR

Figure 5A:
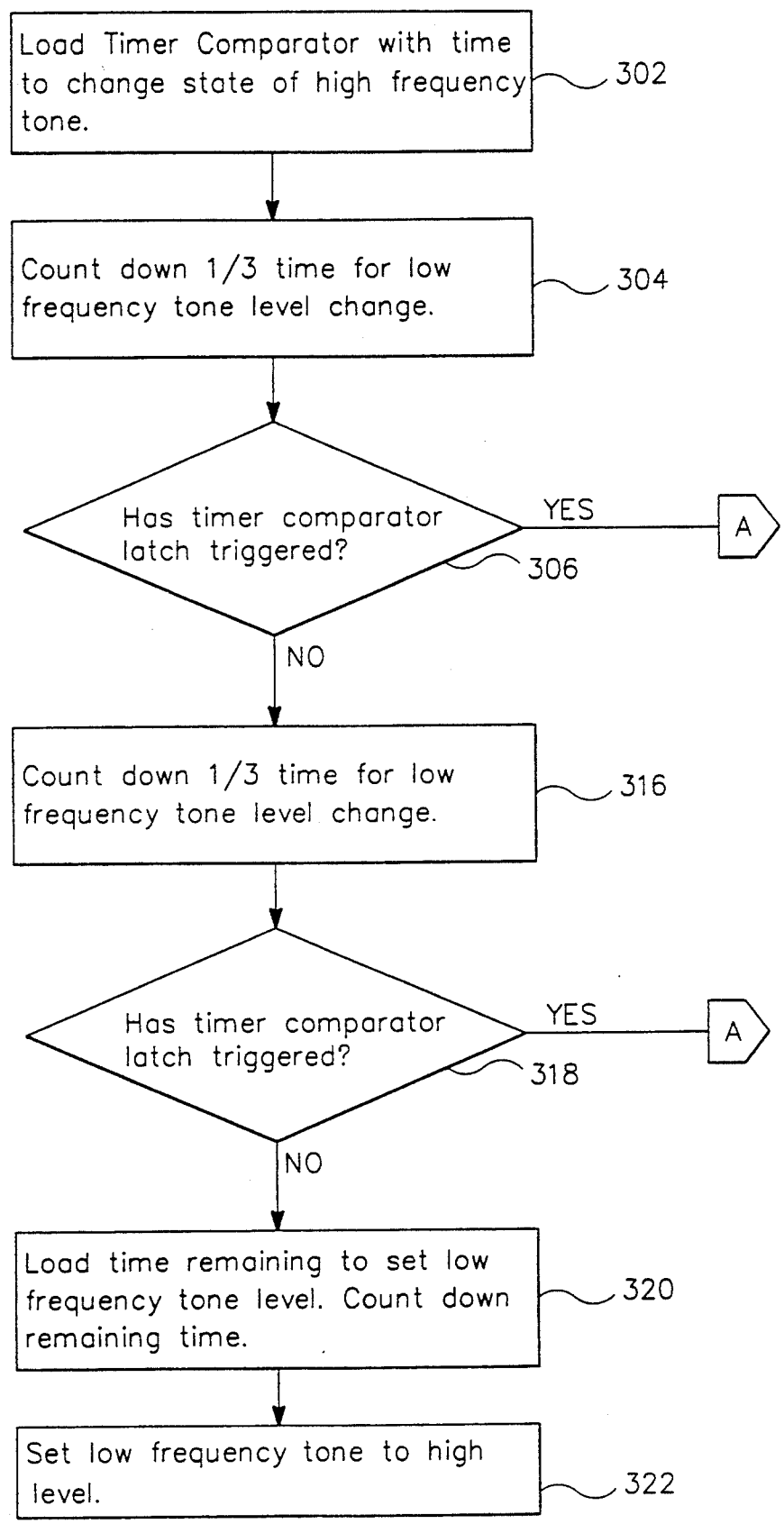
FIG. 5A is a flowchart of the data processing of the DTMF generator of the present invention.
Figure 5B:
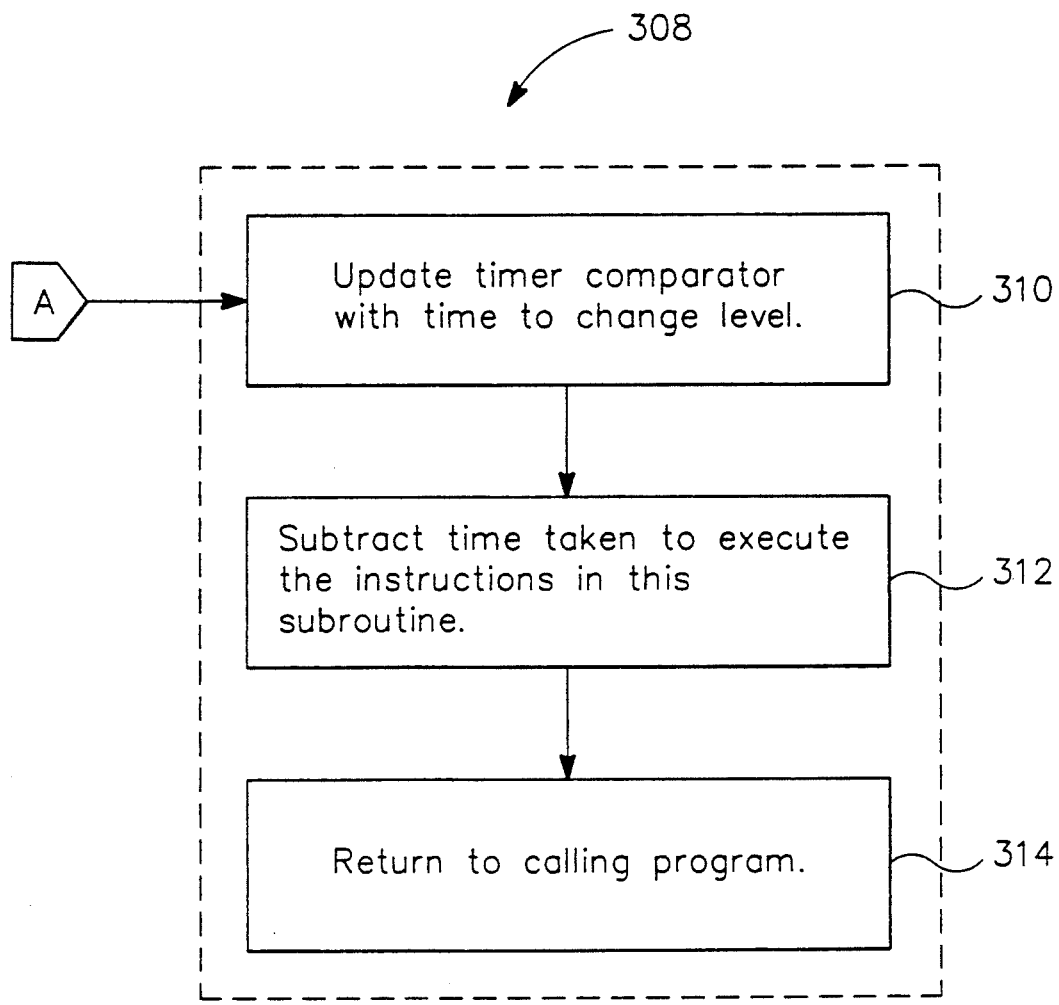
FIG. 5B is a continuation of the flowchart of FIG. 5A.
Figure 6A:
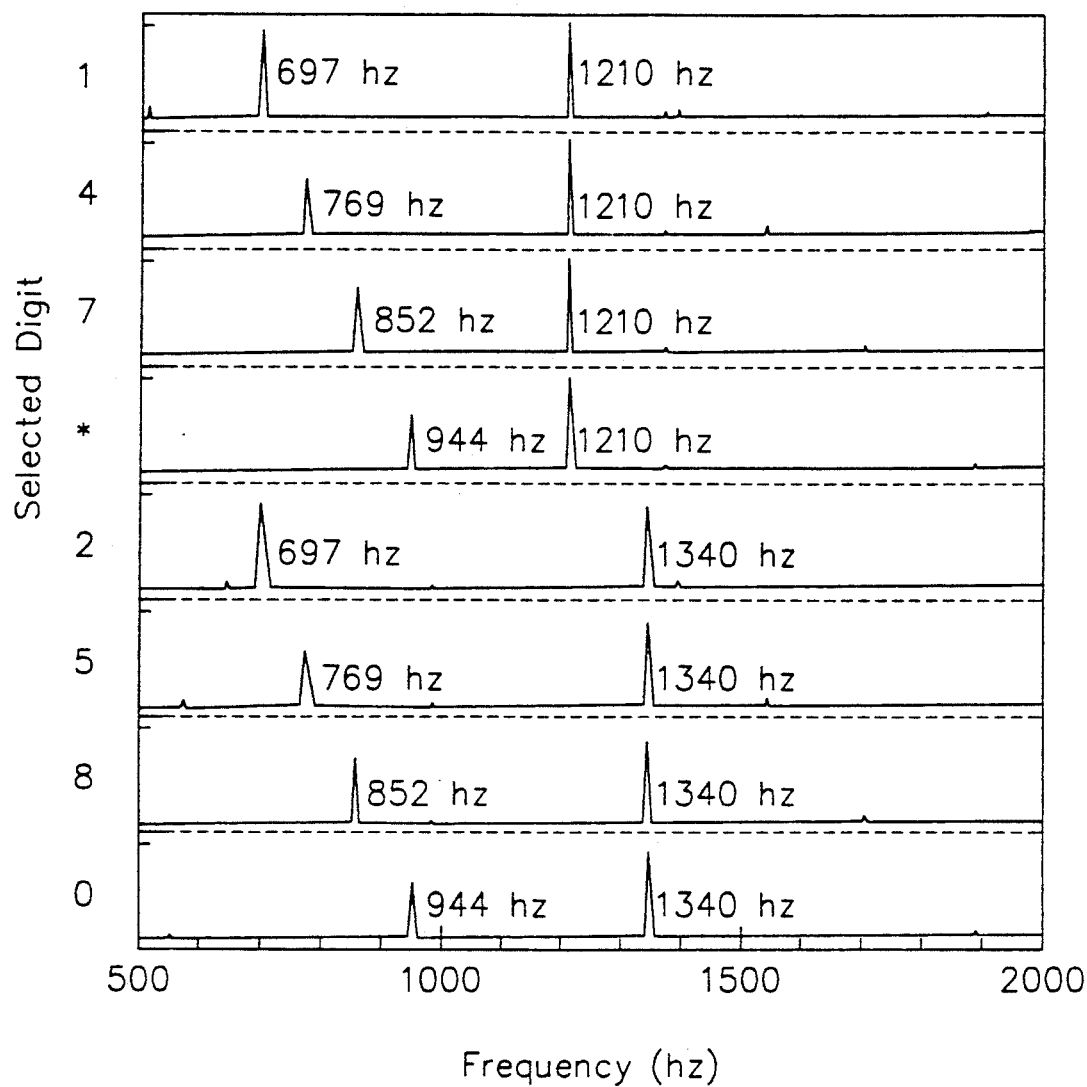
FIG. 6A is a frequency spectrum of some of the tones generated when following the flowchart of FIGS. 5A and 5B.
Figure 6B:
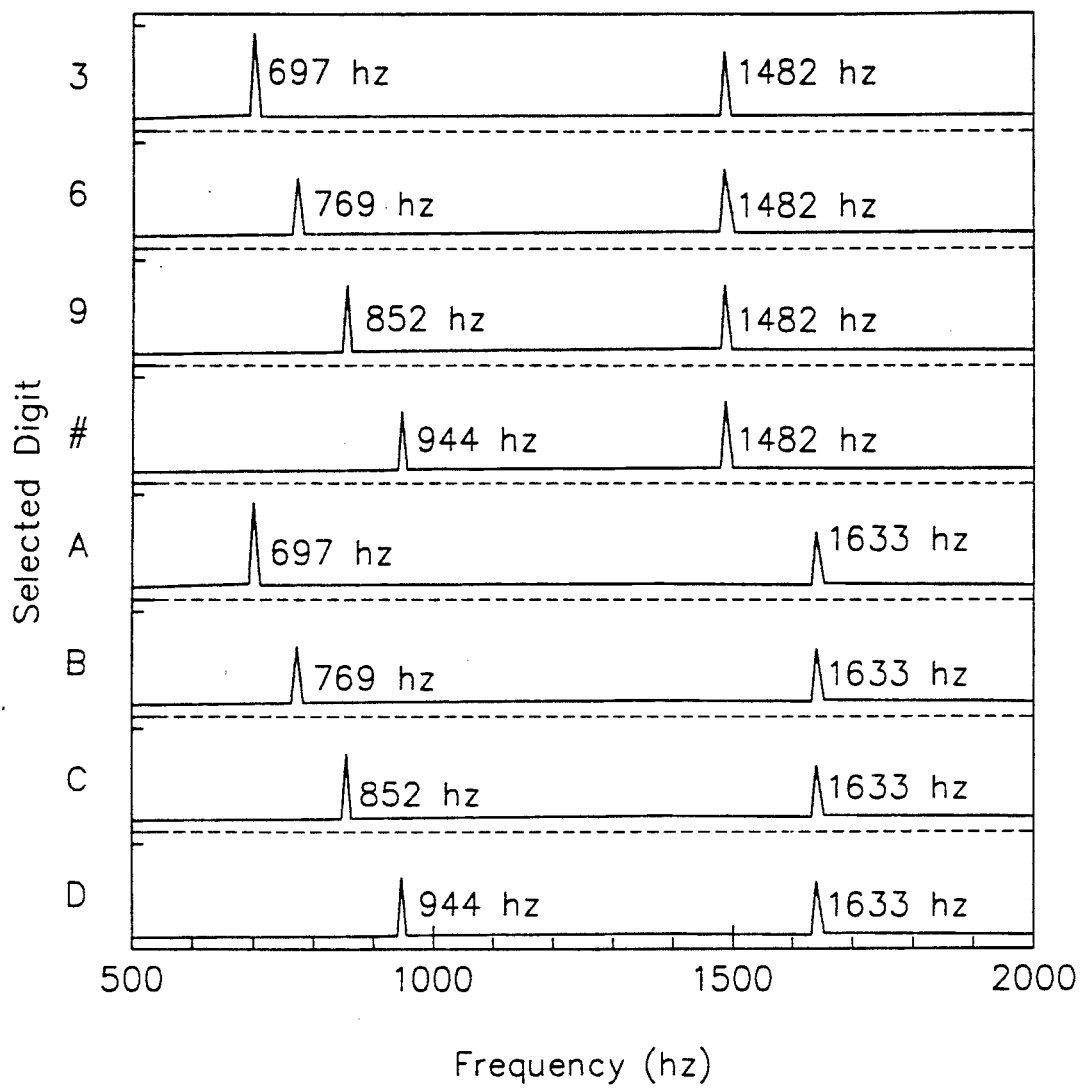
FIG. 6B is a frequency spectrum of more of the tones generated when following the flowchart of FIGS. 5A and 5B.

The security system 10 of the present invention contains a DTMF communication circuitry 14 which contains a DTMF tone generator 124 and a DTMF receiver 132. The security system 10 can report status information such as a low battery detection signal or report the remote telephone number to which status information is to be transmitted. The status information is transmitted over the telephone line 102 using dual-tone multiple frequency (DTMF) tones. In the presently preferred embodiment, the DTMF generator 124 (see FIG. 1A) resides within the microprocessor U4 (see FIG. 8D) to minimize power consumption. The microprocessor U4 uses software timing loops to generate the standard telephone DTMF frequencies at a 50% duty cycle. FIGS. 5A and 5B illustrate the flowchart followed by the DTMF tone generator 124 in its emulation of DTMF tone pairs. It should be noted that the microprocessor U4 has internal timing circuitry comprising a timer, a timer comparator and a timer comparator latch. In block 302 the system loads a timer comparator within the microprocessor U4 with the time to change the state of the high frequency tone. The system counts down one third of the time for the low frequency tone level change in block 304. If the timer comparator latch within the microprocessor U4 has triggered, the result of decision 306 is YES, and the system enters a subroutine 308 (see FIG. 5B) in which the timer comparator latch within the microprocessor U4 is updated with the new time to change level in block 310. In block 312, the system subtracts the time taken to execute the instructions in subroutine 308, and returns to the calling program in block 314. If the timer comparator latch within the microprocessor U4 has not triggered, the result of decision 306 is NO. In that event, the system counts down one third of the time for the low frequency tone level change in block 316 (see FIG. 5A). The system again checks whether the timer comparator latch within the microprocessor U4 is triggered in decision 318. If the timer comparator latch has triggered, the result of decision 318 is YES, and the system calls subroutine 308, which has previously been described. If the timer comparator latch has not triggered, the result of decision 318 is NO. In that event, the system loads the time remaining to set a low frequency tone level and counts down the remaining time in block 320. In block 322 the system sets the low frequency tone to a high level. The system then repeats the above sequence to set a tone to a low level. The entire sequence is repeated continuously to obtain the desired length of the DTMF tone pair. The system of the present invention is able to produce standard DTMF tones with a maximum frequency error of approximately 0.3%. FIGS. 6A and 6B illustrate the spectral purity of the DTMF tone pairs generated by the present invention.

The square waves generated by the microprocessor U4 to emulate the DTMF tone pairs are filtered by the DTMF generator filter 126 (see FIG. 1A). The DTMF generator filter 126 is a 3-pole RC low pass filter which reduces power consumption. The DTMF generator filter for the low frequency tones comprises C11, C21, C22, R41 and R46 (see FIG. 8D), while the DTMF generator filter for the high frequency tones comprises C13, C20, C22, R40 and R51. Those of ordinary skill in the art will recognize, however, that the DTMF generator filter could be a digital filter or an analog filter ranging from passive RC filters to an operational amplifier filter and any number of filter configurations may be used satisfactorily. The filtered DTMF tone pairs are amplified using the analog amplifier 128 then coupled to the telephone line 102 through the audio transformer 130. As is well known in the art, a number of amplifier and coupler configurations may be used to accomplish these tasks. For example, a discrete transistor amplifier and optical coupler may be used to amplify the DTMF tone signal and couple it to the telephone line.

Figure 7A:
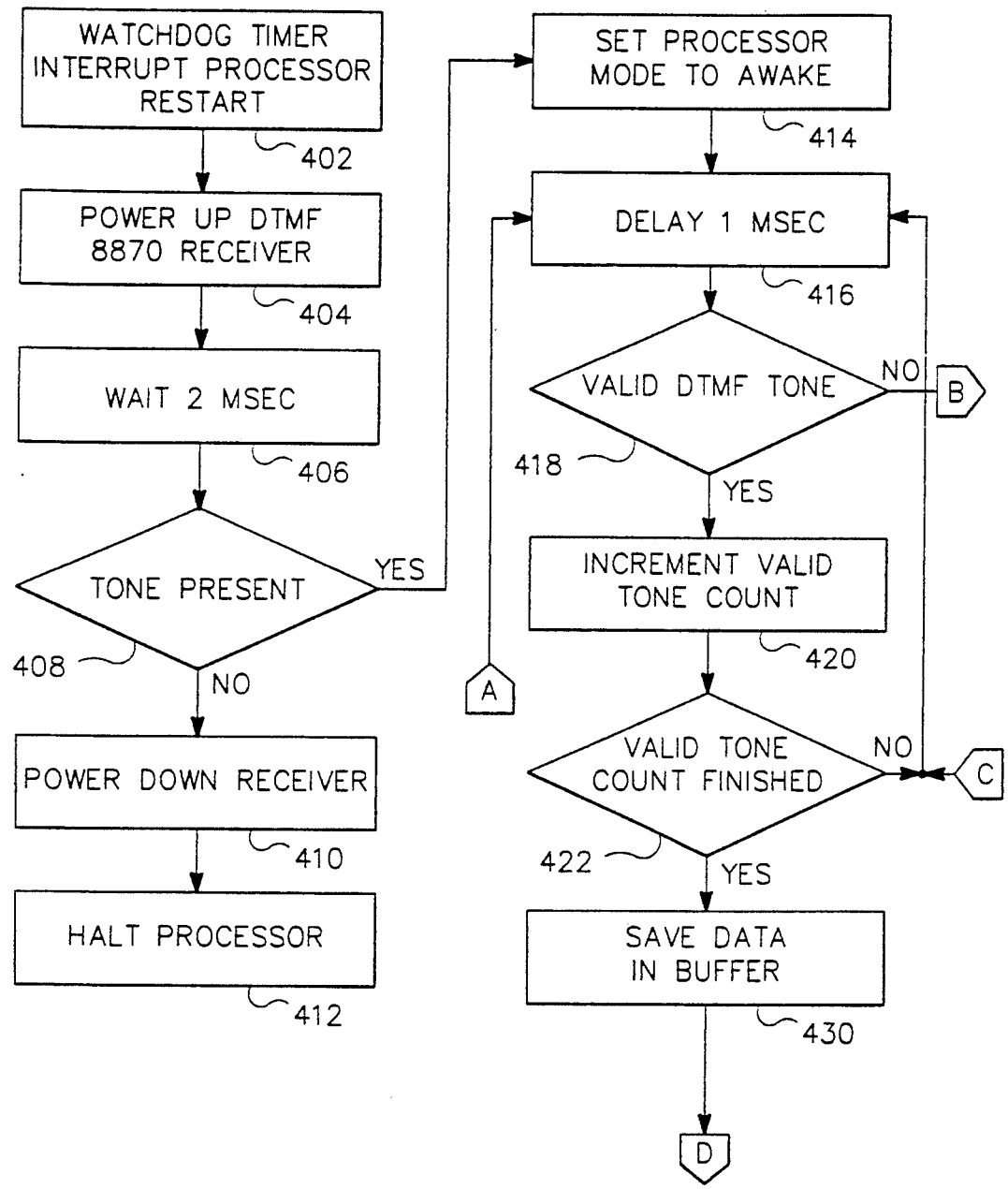
FIG. 7A is a flowchart of the data processing of the DTMF receiver of the present invention.
Figure 7B:
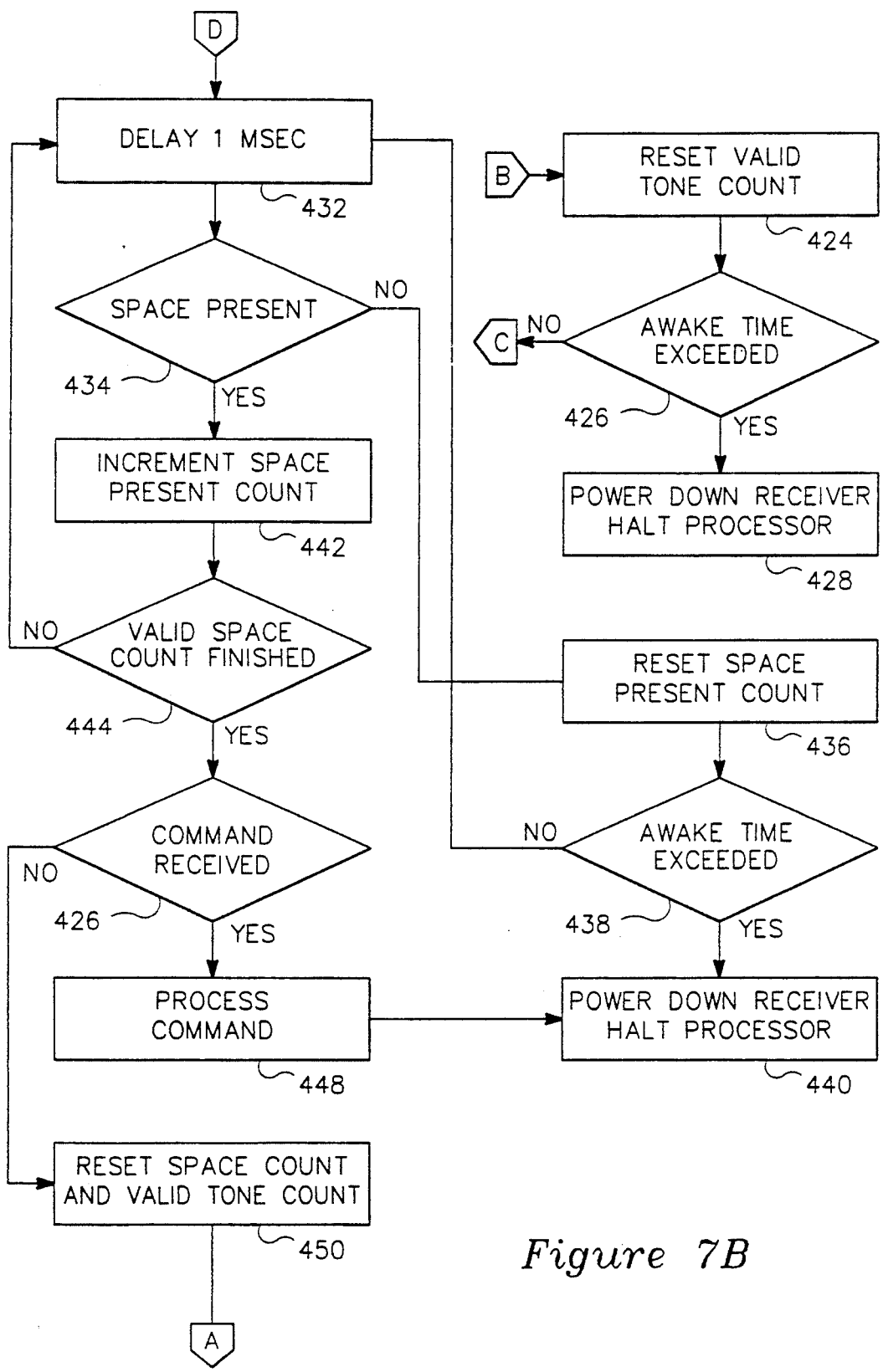
FIG. 7B is a continuation of the flowchart of FIG. 7A.

The DTMF receiver 132 of the DTMF circuitry 14 receives data from a remote location via the telephone line 102. In the presently preferred embodiment of the invention, the DTMF receiver 132 is an integrated circuit type 8870, which is a specialized DTMF receiver chip U7 (see FIG. 8B). The DTMF receiver filter 134 is emulated within the microprocessor U4 to reduce the response time and power consumption of the DTMF receiver chip U7. FIGS. 7A and 7B illustrate the flowchart for the DTMF receiver 132. The DTMF receiver 132 operates in close conjunction with the power management circuitry 16, which will be described in greater detail below. Every 500 milliseconds the watchdog timer 140 (see FIG. 1A) generates a pulse which initiates activity in the microprocessor U4 as shown in block 402 of FIG. 7A. In response to the watchdog timer 140, the microprocessor U4 activates power to the DTMF receiver chip U7 through a transistor Q6 (see FIG. 8B) in block 404. The microprocessor U4 delays 2 milliseconds in block 406 since 2 milliseconds is the minimum response time for the 8870 integrated circuit to determine whether a tone is present. In decision 408 the DTMF receiver chip U7 (see FIG. 8B) determines whether there is a tone present on the telephone line 102. If there is no tone the result of decision 408 is NO, and the microprocessor powers down the DTMF receiver 132 in block 410 and halts the microprocessor in block 412. If a tone is present, the result of decision 408 is YES. In that event, the system sets the microprocessor mode to awake in block 414 and delays 1 millisecond in block 416. The 1 millisecond delay helps assure stability in the 8870 DTMF receiver chip U7.

In decision 418 the microprocessor U4 checks to determine if the tone is a valid DTMF tone. A valid DTMF tone is approximately 20 milliseconds in length followed by a space of approximately 20 milliseconds. However, both of these times may be remotely altered. If the result of decision 418 is NO, the valid tone count is reset in block 424 and the microprocessor determines whether the awake time has been exceeded in decision 426. If the awake time has been exceeded, the result of decision 426 is YES. In that event, the microprocessor powers down the DTMF receiver 132 and halts the microprocessor U4 in block 428. If the awake time has not been exceeded, the result of decision 426 is NO. In that event, control is returned to block 416, which causes an additional 1 millisecond delay. If the tone is a valid DTMF tone, the result of 418 is YES. In that event, the microprocessor increments the valid tone count in block 420 and tests to determine whether the valid tone count has finished.

As previously discussed, a valid DTMF tone is approximately 20 milliseconds long. If the valid tone count is not finished, the result of decision 422 will be NO, and control is returned to block 416 for another 1 millisecond delay. If the valid tone count has finished, the result of decision 422 will be YES, in which case the data is saved in the buffer 136 in block 430. The microprocessor U4 inserts an additional 1 millisecond delay in block 432 and checks to determine whether a space is present in decision 434. If a space is not present, the result of decision 434 is NO and the microprocessor resets the space present count in block 436 and checks to see whether the awake time has been exceeded in decision 438. If the awake time has been exceeded, the result of decision 438 is YES, and the microprocessor powers down the DTMF receiver 132 and halts the microprocessor U4 in block 440. If the awake time has not been exceeded, the result of decision 438 is NO. In that event, the microprocessor control is returned to block 432 which inserts an additional 1 millisecond delay. If a space is present, the result of decision 434 is YES. In that event, the microprocessor increments the space present count in block 442 and tests to determine whether the valid space count is finished.

If the valid space count is not finished, the result of decision 444 is NO. In that event, control is returned to block 434 which inserts another 1 millisecond delay. If the valid space count is finished, the result of decision 444 is YES. In that event the microprocessor U4 tests to determine whether a valid command has been received. If a command has been received, the result of decision 446 is YES, and the microprocessor U4 processes the command in block 448 and then powers down the DTMF receiver 132 and halts the microprocessor U4 in block 440. If the command has not been received, the result of decision 446 is NO. In that event, the microprocessor U4 resets the space count and the valid tone count and returns control to block 416 which inserts a 1 millisecond delay. The above described routine has been implemented in software within the microprocessor U4 in order to minimize power consumption.

In most applications, the security system 10 will not be connected to a dedicated telephone line and must be shared with a telephone line used for normal telephone communications. To differentiate between a normal telephone call and an incoming message to the security system 10, a single predetermined digit is depressed for more than 500 milliseconds. Because the DTMF receiver 132 only wakes up every 500 milliseconds, as described above, this assures that the security system 10 will receive the initial predetermined digit. Following the first digit, DTMF tones and spaces may be sent a much faster rate ranging from 10 to 50 milliseconds. These rates are stored in the nonvolatile memory 138 and may be remotely altered.

The present invention unauthorized access to the system status and system parameters stored in the nonvolatile memory 138 by requiring that a predetermined DTMF access code sequence be received by the security system 10. Since the security system 10 has timing requirements for the tones and spaces, as described above, an additional level of security is added because the correct DTMF code sequence must be received within a strict time frame. Unless the proper DTMF access code sequence is received, the security system 10 will not permit access.

If the correct DTMF access code sequence is received, the system status may be remotely determined. The audio alarm 122 may also be remotely activated or deactivated. Furthermore, system analysis parameters such as variance and coherence values may be remotely altered. When the correct DTMF access code sequence has been received, the DTMF tones are stored in a buffer until the stored DTMF tones comprises a complete command. At that time the microprocessor U4 process the command. The actual command structure for the microprocessor is not discussed here since there are numerous methods that will be known to those of ordinary skill in the art for programming data into a microprocessor.

POWER MANAGEMENT CIRCUITRY

A significant aspect of the design for the security system 10 is that the system must be able to operate, under normal operating conditions, for a minimum of one year on a single set of batteries. In the presently preferred embodiment, the battery 144 comprises four AA alkaline batteries, which are typically rated at 500 milliamp-hours. To achieve the goal of operation for a minimum of one year, the security system 10 reduces current consumption for the entire system to an average 40 microamps, while providing bidirectional DTMF communications and real-time digital analysis of the output signals of the dual infrared sensors 110.

The security system 10 of the present invention achieves the low power consumption in two ways.

First, many functions that can be implemented in power consuming hardware are implemented in software thus reducing current consumption. Second, the security system uses power management circuitry 16 (see FIG. 1A) comprising the watchdog timer 140 in conjunction with a power management circuit 142 to achieve a significant reduction in current consumption. The DTMF tone generator 124, which has been previously described, is accomplished in software rather than hardware. Likewise, the DTMF receiver filter 134 is implemented in software. Thus, a single microprocessor U4 can perform several functions with a resultant savings in power as well as a considerable savings in space on the printed circuit board used.

The DTMF tone generator 124 consumes no power except during periods where data is transmitted to a remote location via the telephone line 102. During periods of generating DTMF tones, the DTMF communication circuitry 14 (which includes the DTMF generator filter 126, amplifier 128, and audio transformer 130), requires approximately 30 milliamps of current at 6 volts. However, the security system 10 designed for low cycle use of the DTMF communicator circuitry 16. In typical usage, the security system 10 may run for months using only the DTMF receiver 132 for arming and disarming the system. It only uses the DTMF tone generator 124 for applications such as intrusion monitoring. In such an application, the DTMF tone generator 124 is active only 15-30 seconds per day The DTMF receiver chip U7 (see FIG. 8B) used for the DTMF receiver 132 has a standby mode. However, even in the standby mode, the DTMF receiver chip U7 would normally consume more than 150 microamps of current at 5 volts. To reduce the power requirement, the valid steering signal circuit of the 8870 integrated circuit is disable by connecting the EST pin (pin 16) and the ST/GT pin (pin17) to the supply voltage through the transistor Q6. By disabling the signal steering circuit, the DTMF receiver chip may be pulse powered with a very short response time (typically 2 milliseconds).

As previously described, the microprocessor U4 (see FIG. 8D) is awakened by the watchdog timer 140 every 500 milliseconds. The watchdog timer 140 itself draws a nominal 10 microamps of current. During the ON period, the microprocessor and the DTMF tone receiver chip U7 consume 6 milliamps of current. However, if the microprocessor U4 does not detect a valid DTMF tone within approximately 2 milliseconds, the microprocessor and the DTMF receiver chip U7 are in the power-up state for only 3 milliseconds. Thus, the average current consumption is approximately 18 microamps. In combination with the watchdog timer 140, the entire DTMF communicator circuitry 14 consumes only 28 microamps of current.

In summary, the security system 10 of the present invention utilizes low power components and a power management system which allow continuous maintenance-free battery operation for a minimum of one year. The DTMF communicator circuitry, emulated in software, requires only a fraction of the power of a typical DTMF communicator. The detection circuitry 12 includes a low power digital conversion of filtered infrared sensor output signal, identification of thermal sources by determining radiation intensity at three separate frequencies and correlation between the two infrared sensors, and adaptive digital software analysis of the infrared sensor output signals.

It is to be understood that, even though numerous embodiments and advantages of the present invention have been set forth in the foregoing description, the above disclosure is illustrative only, and changes may be made in detail yet remain within the board principles of the present invention. Therefore, the present invention is to be limited only by the appended claims.

I claim:

1. A security system connectable to a telephone line, the system comprising:
   a connector for connecting the system to the telephone line;
   a battery providing power to the system;
   a lens system for producing multiple detection ranges and radial detection zones;
   at least a first and second infrared sensor positioned behind said lens system providing substantially uniform detection through a field of view of 180 degrees and generating fluctuating sensor signals in response to external thermal sources crossing boundaries between said detection ranges or said radial detection zones within said field of view;
   an analog preamplifier electrically coupled to said first and second sensors for amplifying said sensor signals to generate amplified sensor signals;
   an alarm filter electrically coupled to said analog preamplifier and filtering said amplified sensor signals to generate filtered sensor signals;
   an analog to digital convertor electrically coupled to said alarm filter for converting said filtered sensor signals to generate digital sensor signals;
   memory for storing a plurality of stored signature values each containing a predetermined digital value corresponding to an authorized activity which should not trigger an alarm condition;
   a digital signal processor electrically coupled to said analog to digital convertor to provide real-time analysis said digital sensor signals, said digital signal processor providing digital filtering of said digital sensor signals to create high pass filtered signals, and storing said filtered signals in a signal buffer to create a time sequence of said filtered signals, calculating a continuous mean value of said stored filtered signals and determining a variance level between said running mean and said digital sensor signals, determining a coherence value between said digital sensor signals from said first infrared sensor and said second infrared sensor, and determining a similarity value between said digital sensor signals and each of said plurality of stored signature values, said digital signal processor generating a trigger to indicate the presence of an intruder if said variance level exceeds a predetermined variance level, said coherence value is below a predetermined coherence level, and each of said similarity value is below a predetermined similarity level for each of said plurality of stored signature values;
   an alarm, responsive to said trigger, to indicate the presence of an intruder;
   a DTMF tone generator electrically coupled to the telephone line through said connector to generate dual-tone multiple frequency (DTMF) tones to communicate status information about the security system, including said alarm indicating the presence of an intruder, to a remote location over the telephone line;

a DTMF receiver electrically coupled to the telephone line through said connector to receive a sequence of tones over the telephone line;

a DTMF filter electrically coupled to said receiver and analyzing each of said tones from said receiver to determine if one of said tones is a valid DTMF tones, said DTMF filter generating a detection signal within a specified period of time if one of said tones is the valid DTMF tone;

a timer circuit continuously powered by said battery and generating periodic signals;

a power manager, responsive to said periodic signals and said detection signal, to generate a control signal, said power manager ceasing generation of said control signal if said DTMF filter does not generate said detection signal within said specified period of time;

a controller, responsive to said control signal, to selectively enable power to said receiver when said control signal is present and disable power to said receiver when said control signal is not present;

a delay circuit to delay operation of said receiver circuit until said enabling power to said receiver is stabilized;

a buffer electrically coupled to said receiver to store each of said valid DTMF tones received as digital data if said DTMF filter generates said detection signal;

a security circuit preventing unauthorized access to said digital data in said buffer by requiring for access a predetermined DTMF access code sequence that is received by said receiver from the remote location over the telephone line; and a command circuit, responsive to said digital data, to process status request commands and digital signal processing commands received over the telephone line from the remote location if said predetermined DTMF access code sequence has been received by said receiver, whereby the security system provides real-time digital analysis of infrared sensor signals, a two direction DTMF communicator and reduced power consumption such that said battery will provide power to the securing system for at least one year.

2. The system of claim 1 wherein said lens system is a three field Fresnel lens which provides detection capability at three or more detection ranges from said first and second sensors.

3. The system of claim 1, further including means within said digital signal processor for creating a plurality of frequency bands by analyzing an amplitude spectrum for each of said stored filtered signals.

4. The system of claim 3 wherein said frequency bands comprise three bands whose periods are determined by the time between every peak, every fourth peak and every seventh peak, respectively, in said amplitude spectrum of said stored filter signals.

5. The system of claim 4 wherein said digital signal processor analyzes said frequency bands and determines said variance level for each of said frequency bands.

6. The system of claim 5 wherein said digital signal processor analyzes said frequency bands and determines each of said similarity value for each of said frequency bands for each of said plurality of stored signature values.

7. The system of claim 1 wherein said digital signal processor generates said trigger if said digital sensor signals are not within a signal range having a predetermined maximum level and a predetermined minimum level.

8. The system of claim 1, further including means for generating status information regarding the current condition of the security system.

9. The system of claim 8, further including means for said DTMF tone generator generating a telephone number associated with the remote location to be called by the security system to report said status information.

10. The system of claim 9, further including means for altering said telephone number of the remote location to be called by the security system to report said status information to the remote location if said predetermined DTMF access code sequence has been received by the security system over the telephone line from the remote location.

11. The system of claim 1 wherein said DTMF generator includes a microprocessor which generates said DTMF tones by generating square waves with a selected duty cycle and frequencies corresponding to said DTMF tones.

12. The system of claim 11, further including a DTMF generator filter to convert said square waves to sine waves.

13. The system of claim 11, further including means for altering said selected duty cycle from the remote location if said predetermined DTMF access code has been received by the security system over the telephone line from the remote location.

14. The system of claim 1, further including means for altering said predetermined DTMF access code sequence from the remote location if said predetermined DTMF access code has been received by the security system over the telephone line from the remote location.

15. The system of claim 1 wherein said DTMF filter includes a microprocessor that digitally filters each of said tones received by said receiver using a preselected digital filter analysis time to determine if each of said tones is the valid DTMF tone.

16. The system of claim 15, further including means for altering said preselected digital filter analysis time from the remote location if said predetermined DTMF access code sequence has been received by the security system over the telephone line from the remote location.

17. A security system connectable to a telephone line, the system comprising:

a lens system for producing multiple detection ranges and radial detection zones;

at least a first and second infrared sensors positioned behind said lens system providing substantially uniform detection through a field of view of 180 degrees and generating fluctuating sensor signals in response to external thermal sources crossing boundaries between said detection ranges or said radial detection zones within said field of view;

an analog preamplifier electrically coupled to said first and second sensors for amplifying said sensor signals to generate amplified sensor signals;

an analog to digital convertor electrically coupled to said analog preamplifier for converting said amplified sensor signals to generate digital sensor signals;

a memory for storing a plurality of stored signature patterns each indicative of a detectable intruder, each of said patterns containing a predetermined series of digital values corresponding to an activity which is designated to not trigger an alarm condition;

a digital signal processor electrically coupled to said analog to digital convertor to analyze said digital sensor signals, said digital signal processor storing said digital sensor signals in a signal buffer to create a time sequence of said digital sensor signals, determining a similarity value between said digital sensor signals and each of said plurality of stored signature patterns and generating a trigger to indicate the presence of an intruder if each of said similarity value is below a predetermined similarity level for each of said plurality of stored signature patterns; and an alarm, responsive to said trigger, to indicate the presence of an intruder.

18. The system of claim 17 wherein said lens system is a three field Fresnel lens which provides detection capability at three or more detection ranges from said first and second sensors.

19. The system of claim 17, further including means within said digital signal processor for creating a plurality of frequency bands by analyzing an amplitude spectrum for each of said stored digital sensor signals.

20. The system of claim 19 wherein said frequency bands comprise three bands whose periods are determined by the time between every peak, every fourth peak and every seventh peak, respectively, in said amplitude spectrum of said stored digital sensor signals.

21. The system of claim 20 wherein said digital signal processor analyzes said frequency bands and determines each of said similarity value for each of said frequency bands for each of said plurality of stored signature patterns.

22. The system of claim 17 wherein said digital signal processor generates said trigger if said digital sensor signals are not within a signal range having a predetermined maximum level and a predetermined minimum level.

23. A security system connectable to a telephone line, the system comprising:

a lens system for producing multiple detection ranges and radial detection zones;

at least a first and second infrared sensors positioned behind said lens system providing substantially uniform detection through a field of view of 180 degrees and generating fluctuating sensor signals in response to external thermal sources crossing boundaries between said detection ranges or said radial detection zones within said field of view;

an analog preamplifier electrically coupled to said first and second sensors for amplifying said sensor signals to generate amplified sensor signals;

an analog to digital convertor electrically coupled to said analog preamplifier for converting said amplified sensor signals to generate digital sensor signals;

a digital signal processor electrically coupled to said analog to digital convertor to analyze said digital sensor signals, said digital signal processor providing digital filtering of said digital sensor signals to create high pass filtered signals, and storing said filtered signals in a signal buffer to create a time sequence of said filtered signals, calculating a continuous mean value of said stored filtered signals and determining a variance level between said continuous mean value and said digital sensor signals, said digital signal processor generating a trigger to indicate the presence of an intruder if said variance level exceeds a predetermined variance level; and an alarm, responsive to said trigger, to indicate the presence of an intruder.

24. The system of claim 23 wherein said lens system is a three field Fresnel lens which provides detection capability at three detection ranges from said first and second sensors.

25. The system of claim 23, further including means within said digital signal processor for creating a plurality of frequency bands by analyzing an amplitude spectrum for each of said stored filtered signals.

26. The system of claim 25 wherein said frequency bands comprise three bands whose periods are determined by the time between every peak, every fourth peak and every seventh peak, respectively, in said amplitude spectrum of said stored filtered signals.

27. The system of claim 26 wherein said digital signal processor analyzes said frequency bands and determines said variance level for each of said frequency bands.

28. The system of claim 23 wherein said digital signal processor generates said trigger if said digital sensor signals are not within a signal range having a predetermined maximum level and a predetermined minimum level.

29. A security system connectable to a telephone line, the system comprising:

a lens system for producing multiple detection ranges and radial detection zones;

at least a first and second infrared sensors positioned behind said lens system providing substantially uniform detection through a field of view of 180 degrees and generating fluctuating sensor signals in response to external thermal sources crossing boundaries between said detection ranges or said radial detection zones within said field of view;

an analog preamplifier electrically coupled to said first and second sensors for amplifying said sensor signals to generate amplified sensor signals;

an analog to digital convertor electrically coupled to said analog preamplifier for converting said amplified sensor signals to generate digital sensor signals;

a digital signal processor electrically coupled to said analog to digital convertor to analyze said digital sensor signals, said digital signal processor storing said digital sensor signals in a signal buffer to create a time sequence of said digital sensor signals, determining a variance level between said stored digital sensor signals and said digital sensor signal, determining a coherence value between said digital sensor signals from said first infrared sensor and said second infrared sensor, and generating a trigger to indicate the presence of an intruder if said variance level exceeds a predetermined variance level and said coherence value is below a predetermined coherence level; and an alarm, responsive to said trigger, to indicate the presence of an intruder.

30. A security system connectable to a telephone line, the system comprising:

a lens system for producing multiple detection ranges and radial detection zones;

at least a first and second infrared sensors positioned behind said lens system providing substantially uniform detection through a field of view of 180 degrees and generating fluctuating sensor signals in response to external thermal sources crossing boundaries between said detection ranges or said radial detection zones within said field of view;

an analog preamplifier electrically coupled to said first and second sensors for amplifying said sensor signals to generate amplified sensor signals;

an analog to digital convertor electrically coupled to said analog preamplifier for converting said amplified sensor signals to generate digital sensor signals;

a digital signal processor electrically coupled to said analog to digital convertor to analyze said digital sensor signals, said digital signal processor providing digital filtering of said digital sensor signals to create high pass filtered signals, and storing said filtered signals in a signal buffer to create a time sequence of said filtered signals, calculating a continuous mean value of said stored filtered signals and determining a variance level between said continuous mean value and said digital sensor signal, determining a coherence value between said digital sensor signals from said first infrared sensor and said second infrared sensor, and generating a trigger to indicate the presence of an intruder if said variance level exceeds a predetermined variance level and said coherence value is below a predetermined coherence level; and an alarm, responsive to said trigger, to indicate the presence of an intruder.

31. The system of claim 30 wherein said lens system is a three field Fresnel lens which provides detection capability at three detection ranges from said first and second sensors.

32. The system of claim 31, further including means within said digital signal processor for creating a plurality of frequency bands by analyzing an amplitude spectrum for each of said stored filtered signals.

33. The system of claim 32 wherein said frequency bands comprise three bands whose periods are determined by the time between every peak, every fourth peak and every seventh peak, respectively, in said amplitude spectrum of said stored filtered signals.

34. The system of claim 33 wherein said digital signal processor analyzes said frequency bands and determines said variance level for each of said frequency bands.

35. The system of claim 30 wherein said digital signal processor generates said trigger if said digital sensor signals are not within a signal range having a predetermined maximum level and a predetermined minimum level.

36. A security system connectable to a telephone line, the system comprising:

a lens system producing multiple detection ranges and radial detection zones;

at least a first and second infrared sensors positioned behind said lens system providing substantially uniform detection through a field of view of 180 degrees and generating fluctuating sensor signals in response to external thermal sources crossing boundaries between said detection ranges or said radial detection zones within said field of view;

an analog preamplifier electrically coupled to said first and second sensors for amplifying said sensor signals to generate amplified sensor signals;

an analog to digital convertor electrically coupled to said analog preamplifier for converting said amplified sensor signals to generate digital sensor signals;

memory for storing a plurality of stored signature patterns each indicative of a detectable intruder, each of said patterns containing a predetermined series of digital values corresponding to an activity which is designated to not trigger an alarm condition;

a digital signal processor electrically coupled to said analog to digital convertor to analyze said digital sensor signals, said digital signal processor providing digital filtering of said digital sensor signals to create high pass filtered signals, and storing said filtered signals in a signal buffer to create a time sequence of said filtered signals, calculating a continuous mean value of said stored filtered signals and determining a variance level between said continuous mean value and said digital sensor signals, determining a coherence value between said digital sensor signals from said first infrared sensor and said second infrared sensor, determining a similarity value between said digital sensor signals and each of said plurality of stored signature patterns, said digital signal processor generating a trigger to indicate the presence of an intruder if said variance level exceeds a predetermined variance level, said coherence value is below a predetermined coherence level and each of said similarity value is below a predetermined similarity level for each of said plurality of stored signature patterns; and an alarm, responsive to said trigger, to indicate the presence of an intruder.

37. The system of claim 36 wherein said lens system is a three field Fresnel lens which provides detection capability at three or more detection ranges from said first and second sensors.

38. The system of claim 36, further including means within said digital signal processor for creating a plurality of frequency bands by analyzing an amplitude spectrum for each of said stored filtered signals.

39. The system of claim 38 wherein said frequency bands comprise three bands whose periods are determined by the time between every peak, every fourth peak and every seventh peak, respectively, in said amplitude spectrum of said stored filtered signals.

40. The system of claim 39 wherein said digital signal processor analyzes said frequency bands and determines said variance level for each of said frequency bands.

41. The system of claim 40 wherein said digital signal processor analyzes said frequency bands and determines each of said similarity value for each of said frequency bands for each of said plurality of stored signature patterns.

42. The system of claim 36 wherein said digital signal processor generates said trigger if said digital sensor signals are not within a signal range having a predetermined maximum level and a predetermined minimum level.

43. A security system, connectable to a telephone line, the system comprising:

a connector for connecting the system to the telephone line;

a battery providing power to the system;

a detection system to detect the presence of an intruder and generate an alarm if an intruder is present;

a DTMF tone generator electrically coupled to the telephone line through said connector to generate dual-tone multiple frequency (DTMF) tones to communicate status information about the security system, including said alarm indicating the presence of an intruder, to a remote location over the telephone line;

a DTMF receiver, electrically coupled to the telephone line through said connector to receive a sequence of tones over the telephone line;

a DTMF filter electrically coupled to said receiver and analyzing each of said tones from said receiver to determine if one of said tones is a valid DTMF tone, said DTMF filter generating a detection signal within a specified period of time if one of said tones is the valid DTMF tone;

a power manager generating a periodic control signal to selectively enable power to said receiver, said power manager ceasing generation of said periodic control signal if said DTMF filter does not generate said detection signal within said specified period of time;

a buffer electrically coupled to said receiver circuit and storing each of said valid DTMF tones received as digital data if said DTMF filter generates said detection signal; and a command circuit, responsive to said digital data, processing status request commands and digital signal processing commands received over the telephone line from the remote location, whereby the security system provides a two direction DTMF communicator with reduced power consumption such that said battery will provide power to the system for at least one year.

44. The system of claim 43, further including means for generating status information regarding the current condition of the security system.

45. The system of claim 44, further including means for said DTMF tone generator generating a telephone number of the remote location to be called by the security system to report said status information.

46. The system of claim 45, further including means for altering the telephone number of the remote location to be called by the security system to report status information to the remote location if a predetermined DTMF access code sequence has been received by the security system over the telephone line from the remote location.

47. The system of claim 43 wherein said DTMF generator includes a microprocessor which generates said DTMF tones by generating square waves with a selected duty cycle and frequencies corresponding to said DTMF tones.

48. The system of claim 47, further including a DTMF generator filter to convert said square waves to sine waves.

49. The system of claim 47, further including means for altering said selected duty cycle from the remote location if a predetermined DTMF access code has been received by the security system over the telephone line from the remote location.

50. The system of claim 43, further including means for altering a predetermined DTMF access code sequence from the remote location if said predetermined DTMF access code has been received by the security system over the telephone line from the remote location.

51. The system of claim 43 wherein said DTMF filter includes a microprocessor that digitally filters each of said tones received by said receiver using a preselected digital filter analysis time to determine if each of said tones is the valid DTMF tone.

52. The system of claim 51, further including means for altering said preselected digital filter analysis time from the remote location if a predetermined DTMF access code sequence has been received by the security system over the telephone line from the remote location.

53. A security system, connectable to a telephone line, the system comprising:

a connector for connecting the system to the telephone line;

a battery providing power to the system;

a detection system to detect the presence of an intruder and generate an alarm if an intruder is present;

a DTMF tone generator electrically coupled to the telephone line through said connector to generate dual-tone multiple frequency (DTMF) tones to communicate status information about the security system, including said alarm indicating the presence of an intruder, to a remote location over the telephone line;

a DTMF receiver, electrically coupled to the telephone line through said connector to receive a sequence of tones over the telephone line;

a DTMF filter electrically coupled to said receiver and analyzing each of said tones from said receiver to determine if one of said tones is a valid DTMF tone, said DTMF filter generating a detection signal within a specified period of time if one of said tones is the valid DTMF tone;

a power manager generating a periodic control signal to selectively enable power to said receiver, said power manager ceasing generation of said periodic control signal if said DTMF filter does not generate said detection signal within said specified period of time;

a buffer electrically coupled to said receiver and storing each of said valid DTMF tones received as digital data if said DTMF filter generates said detection signal;

a security circuit preventing unauthorized access to said digital data in said buffer by requiring for access a predetermined DTMF access code sequence that is received by said receiver from the remote location over the telephone line; and a command circuit, responsive to said digital data, to process status request commands and digital signal processing commands received over the telephone line from the remote location if said predetermined DTMF access code sequence has been received by said receiver, whereby the security system provides a two direction DTMF communicator with reduced power consumption such that said battery will provide power to the security system for at least one year.

54. A security system, connectable to a telephone line, the system comprising:

a connector for connecting the system to the telephone line;

a battery providing power to the system;

a detection system to detect the presence of an intruder and generate an alarm if an intruder is present;

a DTMF tone generator electrically coupled to the telephone line through said connector to generate dual-tone multiple frequency (DTMF) tones to communicate status information about the security system, including said alarm indicating the presence of an intruder, to a remote location over the telephone line;

a DTMF receiver, electrically coupled to the telephone line through said connector to receive a sequence of tones over the telephone line;

a DTMF filter electrically coupled to said receiver and analyzing each of said tones from said receiver to determine if one of said tones is a valid DTMF tone, said DTMF filter generating a detection signal within a specified period of time if one of said tones is the valid DTMF tone;

a timer circuit continuously powered by said battery and generating periodic signals;

a power manager, responsive to said periodic signals and said detection signal, to generate a control signal, said power manager ceasing generation of said control signal if said DTMF filter does not generate said detection signal within said specified period of time;

a controller, responsive to said control signal, to selectively enable power to said receiver when said control signal is present and disable power to said receiver when said control signal is not present;

a buffer electrically coupled to said receiver to store each of said valid DTMF tones received as digital data is said DTMF filter generates said detection signal;

a security circuit preventing unauthorized access to said digital data in said buffer by requiring for access a predetermined DTMF access code sequence that is received by said receiver from the remote location over the telephone line; and a command circuit, responsive to said digital data, to process status request commands and digital signal processing commands received over the telephone line from the remote location if said predetermined DTMF access code sequence has been received by said receiver, whereby the security system provides a two direction DTMF communicator and reduced power consumption such that said battery will provide power to the security system for at least one year.

55. The system of claim 54, further including means for generating status information regarding the current condition of the security system.

56. The system of claim 55, further including means for said DTMF tone generator generating a telephone number of the remote location to be called by the security system to report said status information.

57. The system of claim 56, further including means for altering the telephone number of the remote location to be called by the system to report said status information to the remote location if said predetermined DTMF access code sequence has been received by the security system over the telephone line from the remote location.

58. The system of claim 54 wherein said DTMF generator includes a microprocessor which generates said DTMF tones by generating square waves with a selected duty cycle and frequencies corresponding to said DTMF tones.

59. The system of claim 58, further including a DTMF generator filter to convert said square waves to sine waves.

60. The system of claim 58, further including means for altering said selected duty cycle from the remote location if said predetermined DTMF access code has been received by the security system over the telephone line from the remote location.

61. The system of claim 54, further including means for altering said predetermined DTMF access code sequence from the remote location if said predetermined DTMF access code has been received by the security system over the telephone line from the remote location.

62. The system of claim 54 wherein said DTMF filter includes a microprocessor that digitally filters each of said tones received by said receiver using a preselected digital filter analysis time to determine if each of said tones if a valid DTMF tone.

63. The system of claim 62, further including means for altering said preselected digital filter analysis time from the remote location if said predetermined DTMF access code sequence has been received by the security system over the telephone line from the remote location.

64. A security system connectable to a telephone line, the system comprising:

a connector for connecting the system to the telephone line;

a battery providing power to the system;

a lens system for producing multiple detection ranges and radial detection zones;

infrared sensor means positioned behind said lens system for detecting the presence of an external thermal source, said sensor means and lens system providing substantially uniform detection through a field of view of 180 degrees and generating fluctuating sensor signals in response said external thermal source crossing boundaries between said detection ranges or said radial detection zones within said field of view;

conversion means electrically coupled to said infrared sensor means for converting said sensor signals and generating digital sensor signals;

digital analysis means for analyzing said digital sensor signals and generating a trigger indicative of whether or not said sensor means have detected an intruder;

alarm means, responsive to said trigger, for indicating the presence of an intruder;

DTMF tone generator means electrically coupled to the telephone line through said connector for generating dual-tone multiple frequency (DTMF) tones for communicating status information about the security system, including said alarm means indicating the presence of an intruder, to a remote location over the telephone line;

DTMF receiver means electrically coupled to the telephone line through said connector for receiving a sequence of tones over the telephone line;

DTMF filter means for analyzing each of said tones from said receiver means to determine if one of said tones is a valid DTMF tone, said DTMF filter means generating a detection signal within a specified period of time if one of said tones is the valid DTMF tone;

power manager means for generating a periodic control signal to selectively enable power to said receiver means, said power manager means ceasing generation of said periodic control signal if said DTMF filter means does not generate said detection signal within said specified period of time;

buffer means for storing each of said valid DTMF tones as digital data if said DTMF filter means generates said detection signal;

security means for preventing unauthorized access to said digital data in said buffer by requiring for access a predetermined DTMF access code sequence that is received by said receiver means from the remote location over the telephone line; and command means, responsive to said digital data, processing status request commands and digital signal processing commands received by said receiver means over the telephone line from the remote location if said predetermined DTMF access code sequence has been received by said receiver, whereby the security system provides digital analysis of infrared sensor signals, a two direction DTMF communicator and reduced power consumption such that said battery will provide power to said circuitry for at least one year.

65. The system of claim 64 wherein said lens system is a three field Fresnel lens which provides detection capability at three or more detection ranges from said infrared sensor means.

66. The system of claim 64 wherein said battery comprises four AA alkaline batteries.

67. The system of claim 64 wherein said infrared sensor means comprises a pair of pyroelectric infrared sensors.

68. The system of claim 64, further including analysis of a time sequence of said sensor signals by said digital analysis means to determine the change in sensor signal levels over time.

69. The system of claim 68 wherein said digital analysis means includes a high pass filter and a low pass filter of said digital sensor signals.

70. The system of claim 69 wherein said digital analysis means analyzes the symmetry of said sensor signals over time.

71. The system of claim 70 wherein said digital analysis means analyzes the variation in said sensor signals from a predetermined voltage.

72. The system of claim 64, further including means for generating status information regarding the current condition of the security system.

73. The system of claim 72, further including means for said DTMF tone generator means to generate a telephone number associated with the remote location to be called by the security system to report said status information.

74. The system of claim 73, further including means for altering the telephone number of the remote location to be called by said security system to report said status information if said predetermined DTMF access code sequence has been received by the security system over the telephone line from the remote location.

75. The system of claim 64 wherein said DTMF tone generator means includes a microprocessor which generates said DTMF tones by generating square waves with a selected duty cycle and frequencies corresponding to said DTMF tones.

76. The system of claim 75, further including DTMF generator filter means to generate sine waves from said square waves.

77. The system of claim 75, further including means for altering said selected duty cycle from the remote location if said predetermined DTMF access code has been received by the security system over the telephone line from the remote location.

78. The system of claim 64, further including means for altering said predetermined DTMF access code sequence from the remote location if said predetermined DTMF access code has been received by the security system over the telephone line from the remote location.

79. The system of claim 64 wherein said DTMF filter means includes a microprocessor that digitally filters each of said tones using a preselected digital filter analysis time to determine if each of said tones is a valid DTMF tone.

80. The system of claim 79, further including means for altering said preselected digital filter analysis time from the remote location if said predetermined DTMF access code sequence has been received by the security system over the telephone line from the remote location.

81. The system of claim 64 wherein said digital analysis means generates said trigger if said digital sensor signals is not within a signal range having a predetermined maximum level and a predetermined minimum level.

* * * * *

UNITED STATES PATENT AND TRADEMARK OFFICE
CERTIFICATE OF CORRECTION

PATENT NO. : 5,317,620
DATED : May 31, 1994
INVENTOR(S) : Milton O. Smith

It is certified that error appears in the above-indentified patent and that said Letters Patent is hereby corrected as shown below:

In column 16, claim 1, line 46, please delete "running mean" and substitute therefor --continuous mean value--.

In column 25, claim 54, line 24, please delete "is" and substitute therefor --if--.

In column 28, claim 81, line 41, please delete "is" and substitute therefor --are--.

Signed and Sealed this

Sixth Day of September, 1994

Attest:

BRUCE LEHMAN

*Attesting Officer*  *Commissioner of Patents and Trademarks*